United States Patent
Hua et al.

(10) Patent No.: US 12,044,850 B2
(45) Date of Patent: Jul. 23, 2024

(54) HEAD-MOUNTED LIGHT FIELD DISPLAY WITH INTEGRAL IMAGING AND WAVEGUIDE PRISM

(71) Applicant: Arizona Board of Regents on Behalf of the University of Arizona, Tucson, AZ (US)

(72) Inventors: Hong Hua, Tucson, AZ (US); Hekun Huang, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 537 days.

(21) Appl. No.: 16/491,839

(22) PCT Filed: Mar. 6, 2018

(86) PCT No.: PCT/US2018/021089
§ 371 (c)(1),
(2) Date: Sep. 6, 2019

(87) PCT Pub. No.: WO2018/165119
PCT Pub. Date: Sep. 13, 2018

(65) Prior Publication Data
US 2020/0393677 A1 Dec. 17, 2020

Related U.S. Application Data

(60) Provisional application No. 62/469,100, filed on Mar. 9, 2017.

(51) Int. Cl.
*G02B 27/01* (2006.01)
*F21V 8/00* (2006.01)
(Continued)

(52) U.S. Cl.
CPC ....... *G02B 27/0172* (2013.01); *G02B 3/0006* (2013.01); *G02B 6/002* (2013.01);
(Continued)

(58) Field of Classification Search
CPC .. G02B 27/0172; G02B 3/0006; G02B 6/002; G02B 6/0031; G02B 6/0045;
(Continued)

(56) References Cited

U.S. PATENT DOCUMENTS 3,493,290 A 2/1970 Traub
3,632,184 A 1/1972 King
(Continued)

FOREIGN PATENT DOCUMENTS

CN 1252133 A 5/2000
CN 101359089 A 2/2009
(Continued)

OTHER PUBLICATIONS

US 9,207,443 B2, 12/2015, Cheng (withdrawn)
(Continued)

*Primary Examiner* — Collin X Beatty
(74) *Attorney, Agent, or Firm* — Niels Haun; Dann, Dorfman, Herrell & Skillman, P.C.

(57) ABSTRACT

Freeform waveguide prism and use with head-mounted light field display with integral imaging and relay group.

23 Claims, 19 Drawing Sheets

(51) Int. Cl.
*G02B 3/00* (2006.01)
*G02B 13/00* (2006.01)

(52) U.S. Cl.
CPC ......... *G02B 6/0031* (2013.01); *G02B 6/0045* (2013.01); *G02B 6/0055* (2013.01); *G02B 13/0095* (2013.01); *G02B 2027/011* (2013.01); *G02B 2027/0123* (2013.01); *G02B 2027/013* (2013.01); *G02B 2027/0134* (2013.01)

(58) Field of Classification Search
CPC .............. G02B 6/0055; G02B 13/0095; G02B 2027/011; G02B 2027/0123; G02B 2027/013; G02B 2027/0134
USPC ......................................................... 359/462
See application file for complete search history.

(56) References Cited

U.S. PATENT DOCUMENTS

| | | | |
|---|---|---|---|
| 3,992,084 A | 11/1976 | Nakamura | |
| 4,468,101 A | 8/1984 | Ellis | |
| 4,669,810 A | 6/1987 | Wood | |
| 4,753,522 A | 6/1988 | Nishina | |
| 4,863,251 A | 9/1989 | Herloski | |
| 5,109,469 A | 4/1992 | Duggan | |
| 5,172,272 A | 12/1992 | Aoki | |
| 5,172,275 A | 12/1992 | Dejager | |
| 5,416,315 A | 5/1995 | Filipovich | |
| 5,436,763 A | 7/1995 | Chen | |
| 5,526,183 A | 6/1996 | Chen | |
| 5,572,229 A | 11/1996 | Fisher | |
| 5,621,572 A | 4/1997 | Fergason | |
| 5,625,495 A | 4/1997 | Moskovich | |
| 5,699,194 A | 12/1997 | Takahashi | |
| 5,701,202 A | 12/1997 | Takahashi | |
| 5,706,136 A | 1/1998 | Okuyama | |
| 5,818,632 A | 10/1998 | Stephenson | |
| 5,880,711 A | 3/1999 | Tamada | |
| 5,880,888 A | 3/1999 | Schoenmakers | |
| 5,917,656 A | 6/1999 | Hayakawa | |
| 5,959,780 A | 9/1999 | Togino | |
| 6,008,781 A | 12/1999 | Furness | |
| 6,023,373 A | 2/2000 | Inoguchi | |
| 6,028,606 A | 2/2000 | Kolb | |
| 6,034,823 A | 3/2000 | Togino | |
| 6,198,577 B1 | 3/2001 | Kedar | |
| 6,201,646 B1 | 3/2001 | Togino | |
| 6,236,521 B1 | 5/2001 | Nanba | |
| 6,239,915 B1 | 5/2001 | Takagi | |
| 6,243,199 B1 | 6/2001 | Hansen | |
| 6,271,972 B1 | 8/2001 | Kedar | |
| 6,384,983 B1 | 5/2002 | Yamazaki | |
| 6,396,639 B1 | 5/2002 | Togino | |
| 6,404,561 B1 | 6/2002 | Isono | |
| 6,404,562 B1 | 6/2002 | Ota | |
| 6,433,376 B2 | 8/2002 | Kim | |
| 6,433,760 B1 | 8/2002 | Vaissie | |
| 6,493,146 B2 | 12/2002 | Inoguchi | |
| 6,510,006 B1 | 1/2003 | Togino | |
| 6,563,648 B2 | 5/2003 | Gleckman | |
| 6,646,811 B2 | 11/2003 | Inoguchi | |
| 6,653,989 B2 | 11/2003 | Nakanishi | |
| 6,671,099 B2 | 12/2003 | Nagata | |
| 6,731,434 B1 | 5/2004 | Hua | |
| 6,829,113 B2 | 12/2004 | Togino | |
| 6,963,454 B1 | 11/2005 | Martins | |
| 6,999,239 B1 | 2/2006 | Martins | |
| 7,152,977 B2 | 12/2006 | Ruda | |
| 7,177,083 B2 | 2/2007 | Holler | |
| 7,230,583 B2 | 6/2007 | Tidwell | |
| 7,249,853 B2 | 7/2007 | Weller-Brophy | |
| 7,405,881 B2 | 7/2008 | Shimizu | |
| 7,414,791 B2 | 8/2008 | Urakawa | |
| 7,522,344 B1 | 4/2009 | Curatu | |
| 8,467,133 B2 | 6/2013 | Miller | |
| 8,503,087 B1 | 8/2013 | Amirparviz | |
| 8,511,827 B2 | 8/2013 | Hua | |
| 9,201,193 B1 | 12/2015 | Smith | |
| 9,239,453 B2 | 1/2016 | Cheng | |
| 9,310,591 B2 | 4/2016 | Hua | |
| 9,720,232 B2 | 8/2017 | Hua | |
| 9,791,700 B2* | 10/2017 | Schowengerdt | ........ G06T 15/00 |
| 9,874,760 B2 | 1/2018 | Hua | |
| 2001/0009478 A1 | 7/2001 | Yamazaki | |
| 2001/0048561 A1 | 12/2001 | Heacock | |
| 2002/0015116 A1 | 2/2002 | Park | |
| 2002/0041446 A1 | 4/2002 | Nagaoka | |
| 2002/0051299 A1 | 5/2002 | Togino | |
| 2002/0060850 A1 | 5/2002 | Takeyama | |
| 2002/0063913 A1 | 5/2002 | Nakamura | |
| 2002/0067467 A1 | 6/2002 | Dorval | |
| 2002/0114077 A1 | 8/2002 | Javidi | |
| 2002/0181115 A1 | 12/2002 | Massof | |
| 2003/0076591 A1 | 4/2003 | Ohmori | |
| 2003/0090753 A1 | 5/2003 | Takeyama | |
| 2004/0136097 A1 | 7/2004 | Park | |
| 2004/0164927 A1 | 8/2004 | Suyama | |
| 2004/0196213 A1 | 10/2004 | Tidwell | |
| 2004/0218243 A1 | 11/2004 | Yamazaki | |
| 2004/0233551 A1 | 11/2004 | Takahashi | |
| 2005/0036119 A1 | 2/2005 | Ruda | |
| 2005/0179868 A1 | 8/2005 | Seo | |
| 2005/0248849 A1 | 11/2005 | Urey | |
| 2006/0028400 A1 | 2/2006 | Lapstun | |
| 2006/0119951 A1 | 6/2006 | McGuire | |
| 2007/0109505 A1 | 5/2007 | Kubara | |
| 2007/0246641 A1 | 10/2007 | Baun | |
| 2008/0036853 A1 | 2/2008 | Shestak | |
| 2008/0094720 A1 | 4/2008 | Yamazaki | |
| 2008/0291531 A1 | 11/2008 | Heimer | |
| 2009/0115842 A1 | 5/2009 | Saito | |
| 2009/0153960 A1 | 6/2009 | Inoguchi | |
| 2009/0168010 A1 | 7/2009 | Vinogradov | |
| 2009/0256943 A1 | 10/2009 | Kondo | |
| 2010/0091027 A1 | 4/2010 | Oyama | |
| 2010/0109977 A1 | 5/2010 | Yamazaki | |
| 2010/0208372 A1 | 8/2010 | Heimer | |
| 2010/0271698 A1 | 10/2010 | Kessler | |
| 2010/0289970 A1 | 11/2010 | Watanabe | |
| 2011/0037951 A1 | 2/2011 | Hua | |
| 2011/0043644 A1 | 2/2011 | Munger | |
| 2011/0075257 A1 | 3/2011 | Hua | |
| 2011/0090389 A1 | 4/2011 | Saito | |
| 2011/0221656 A1 | 9/2011 | Haddick | |
| 2012/0013988 A1 | 1/2012 | Hutchin | |
| 2012/0019557 A1 | 1/2012 | Aronsson | |
| 2012/0050891 A1 | 3/2012 | Seidl | |
| 2012/0057129 A1 | 3/2012 | Durnell | |
| 2012/0081800 A1 | 4/2012 | Cheng | |
| 2012/0113092 A1 | 5/2012 | Bar-Zeev | |
| 2012/0160302 A1 | 6/2012 | Citron | |
| 2012/0162549 A1* | 6/2012 | Gao | ...................... G02B 27/283 |
| | | | 359/651 |
| 2012/0242697 A1 | 9/2012 | Border | |
| 2012/0262802 A1 | 10/2012 | Huang | |
| 2012/0320161 A1 | 12/2012 | Javidi | |
| 2013/0100524 A1 | 4/2013 | Magarill | |
| 2013/0112705 A1 | 5/2013 | McGill | |
| 2013/0182317 A1 | 7/2013 | Takahashi | |
| 2013/0187836 A1 | 7/2013 | Cheng | |
| 2013/0222896 A1 | 8/2013 | Komatsu | |
| 2013/0258461 A1 | 10/2013 | Sato | |
| 2013/0285885 A1 | 10/2013 | Nowatzyk | |
| 2013/0286053 A1 | 10/2013 | Fleck | |
| 2013/0300634 A1 | 11/2013 | White | |
| 2013/0329304 A1 | 12/2013 | Hua | |
| 2014/0009845 A1 | 1/2014 | Cheng | |
| 2014/0035959 A1* | 2/2014 | Lapstun | ............. G02B 27/0075 |
| | | | 359/200.7 |
| 2014/0049833 A1 | 2/2014 | Totani | |
| 2014/0071539 A1 | 3/2014 | Gao | |
| 2014/0085282 A1 | 3/2014 | Luebke | |
| 2014/0139403 A1 | 5/2014 | Hiraide | |

(56) References Cited

U.S. PATENT DOCUMENTS

| | | |
|---|---|---|
| 2014/0300869 A1 | 10/2014 | Hirsch |
| 2014/0340390 A1 | 11/2014 | Lanman |
| 2014/0347361 A1 | 11/2014 | Alpaslan |
| 2014/0361957 A1 | 12/2014 | Hua |
| 2015/0168802 A1 | 6/2015 | Bohn |
| 2015/0177445 A1 | 6/2015 | Takagi |
| 2015/0201176 A1 | 7/2015 | Graziosi |
| 2015/0208061 A1 | 7/2015 | Yang |
| 2015/0212321 A1 | 7/2015 | Zhao |
| 2015/0277129 A1 | 10/2015 | Hua |
| 2015/0346495 A1 | 12/2015 | Welch |
| 2015/0363978 A1 | 12/2015 | Maimone |
| 2016/0011419 A1 | 1/2016 | Gao |
| 2016/0085075 A1* | 3/2016 | Cheng ............... G02B 27/0172 359/631 |
| 2016/0239985 A1 | 8/2016 | Haddick et al. |
| 2016/0320620 A1 | 11/2016 | Maimone |
| 2017/0078652 A1 | 3/2017 | Hua |
| 2017/0102545 A1 | 4/2017 | Hua |
| 2017/0202633 A1 | 7/2017 | Liu |
| 2018/0045949 A1 | 2/2018 | Hua |
| 2018/0343434 A1 | 11/2018 | Perreault |

FOREIGN PATENT DOCUMENTS

| | | | | |
|---|---|---|---|---|
| CN | 101424788 A | 5/2009 | | |
| EP | 0408344 | 1/1991 | | |
| EP | 1102105 | 5/2001 | | |
| FR | 2928034 | 8/2009 | | |
| JP | 02200074 | 8/1990 | | |
| JP | H03101709 | 4/1991 | | |
| JP | 08160345 | 6/1996 | | |
| JP | H09218375 A | 8/1997 | | |
| JP | H09297282 | 11/1997 | | |
| JP | H1013861 | 1/1998 | | |
| JP | H10307263 | 11/1998 | | |
| JP | H11326820 A | 11/1999 | | |
| JP | 2000501857 | 2/2000 | | |
| JP | 2000249974 | 9/2000 | | |
| JP | 2001013446 | 1/2001 | | |
| JP | 2001066543 A | 3/2001 | | |
| JP | 2001145127 | 5/2001 | | |
| JP | 2001238229 | 8/2001 | | |
| JP | 2002148559 | 5/2002 | | |
| JP | 2003241100 | 8/2003 | | |
| JP | 2006091333 | 4/2006 | | |
| JP | 2006276884 A | 10/2006 | | |
| JP | 2007101930 | 4/2007 | | |
| JP | 2010072188 | 4/2010 | | |
| JP | 2014505381 | 2/2014 | | |
| WO | 9810402 | 3/1998 | | |
| WO | 9923647 | 5/1999 | | |
| WO | 2004079431 A1 | 9/2004 | | |
| WO | 2007002694 A2 | 1/2007 | | |
| WO | 2007085682 | 8/2007 | | |
| WO | 2007002694 A3 | 12/2007 | | |
| WO | 2007140273 A2 | 12/2007 | | |
| WO | 2008089417 A2 | 7/2008 | | |
| WO | 2011134169 | 11/2011 | | |
| WO | 2012064546 | 5/2012 | | |
| WO | 2012118573 | 9/2012 | | |
| WO | 2013112705 | 8/2013 | | |
| WO | 2014062912 | 4/2014 | | |
| WO | 2015134738 | 9/2015 | | |
| WO | 2015134740 | 9/2015 | | |
| WO | 2015184409 | 12/2015 | | |
| WO | WO-2015184409 A1 * | 12/2015 | ......... | G02B 26/0825 |
| WO | 2016033317 | 3/2016 | | |
| WO | 2018052590 | 3/2018 | | |

OTHER PUBLICATIONS

US 9,213,186 B2, 12/2015, Cheng (withdrawn)
US 9,880,387 B2, 01/2018, Hua (withdrawn)

F.Z. Fang, X.D. Zhang, A. Weckenmann, G.X. Zhang, C. Evans, Manufacturing and measurement of freeform optics, CIRP Annals, vol. 62, Issue 2, 2013, pp. 823-846, ISSN 0007-8506, https://doi.org/10.1016/j.cirp.2013.05.003.(https://www.sciencedirect.com/science/article/pii/S0007850613001935) (Year: 2013).*
H. Hua, "Enabling focus cues in head-mounted displays," Proceedings of the IEEE 105(5), 805-824 (2017).
G. E. Favalora, "Volumetric 3D displays and application infrastructure," Computer, 38(8), 37-44 (2005).
H. Yu, K. Lee, J. Park, and Y. Park, "Ultrahigh-definition dynamic 3D holographic display by active control of vol. speckle fields," Nature Photonics 11(3), 186 (2017).
G. Li, D. Lee, Y. Jeong, J. Cho, and B. Lee, "Holographic display for see-through augmented reality using mirror-lens holographic optical element," Opt. Letters 41(11), 2486-2489 (2016).
S. B. Kim and J. H. Park, "Optical see-through Maxwellian near-to-eye display with an enlarged eyebox," Opt. Letters 43(4), 767-770 (2018).
D. Lanman and D. Luebke, "Near-eye light field displays," ACM Trans. Graph. 32(6), 1-10 (2013).
H. Huang and H. Hua, "High-performance integral-imaging-based light field augmented reality display using freeform optics," Opt. Express 26(13), 17578-17590 (2018).
B. Liu, X. Sang, X. Yu, X. Gao, L. Liu, C. Gao, P. Wang, Y. Le, and J. Du, "Time-multiplexed light field display with 120-degree wide viewing angle". Opt. Express 27(24), pp. 35728-35739 (2019).
H. Huang and H. Hua, "Generalized methods and strategies for modeling and optimizing the optics of 3D head-mounted light field displays," Opt. Express 27(18), 25154-25171 (2019).
H. Huang and H. Hua, "Systematic characterization and optimization of 3D light field displays," Opt. Express 25(16), 18508-18525 (2017).
J. H. Park, S. W. Min, S. Jung, and B. Lee. "Analysis of viewing parameters for two display methods based on integral photography." Applied Optics 40, No. 29 5217-5232 (2001).
X. Wang, Y. Qin, H. Hua, Y. H. Lee, and S. T. Wu. "Digitally switchable multi-focal lens using freeform optics." Opt. Express 16;26(8):11007-17(2018).
X. Wang, and H. Hua. "Digitally Switchable Micro Lens Array for Integral Imaging." SID Symposium Digest of Technical Papers. vol. 51. No. 1. (2020).
M. Xu and H. Hua, "Finite-depth and varifocal head-mounted display based on geometrical lightguide," Opt. Express 28(8), 12121-12137 (2020).
Jason Geng: "Three-dimensional display technologies", Advances in Optics and Photonics, vol. 5, No. 4, Nov. 22, 2013 (Nov. 22, 2013), pp. 456-535.
Cheol-Joong Kim et al, "Depth plane adaptive integral imaging using a varifocal liquid lens array" , Applied Optics, OSA, vol. 54, No. 10, Apr. 1, 2015 (Apr. 1, 2015) , pp. 2565-2571.
Xin Shen et al: "Large depth of focus dynamic micro integral imaging for optical see-through augmented reality display using a focus-tunable lens", Applied Optics, vol. 57, No. 7, Mar. 1, 2018 (Mar. 1, 2018), p. B184.
Martinez-Cuenca R et al: "Progress in 3-D Multiperspective Display by Integral Imaging", Proceedings of the IEEE, IEEE. New York, US, vol. 97, No. 6, Jun. 1, 2009 (Jun. 1, 2009), pp. 1067-1077.
Kim Cheoljoong et al: "Depth-enhanced integral imaging display system with time-multiplexed depth planes using a varifocal liquid lens array", Proceedings of SPIE, IEEE, US, vol. 9385, Mar. 11, 2015 (Mar. 11, 2015), pp. 93850D-93850D.
Huan Deng et al: "The Realization of Computer Generated Integral Imaging Based on Two Step Pickup Method", Photonics and Optoelectronic (SOPO), 2010 Symposium on, IEEE, Piscataway, NJ, USA, Jun. 19, 2010 (Jun. 19, 2010), pp. 1-3.
'Fresnel Lenses' downloaded from http://www.fresneltech.com on Jun. 8, 2011. Copyright Fresnel Technologies, Inc., 2003.
Azuma, R., et al., 'Recent advances in augmented reality', IEEE Computer Graphics App;. 21, 34-47 (2001).
Bajura, M., et al., "Merging virtual objects with the real world: seeing ultrasound imagery within the patient" in Proceedings of ACM SIGGRAPH (ACM, Chicago, 1992), pp. 203-210.

(56) References Cited

OTHER PUBLICATIONS

Biocca, et al., "Virtual eyes can rearrange your body: adapting to visual displacement in see-through, head-mounted displays", Presence: Teleoperators and Virtual Environments 7, 262-277 (1998).

Bunkenburg, J. 'Innovative Diffractive Eyepiece for Helmet-Mounted Display.' SPIE vol. 3430. pp. 41-49 Jul. 1998.

C. Curatu, H. Hua, and J. P. Rolland, "Projection-based headmounted display with eye-tracking capabilities," Proc. SPIE 5875, 587050J (2005).

Cakmakci, O., et al., 'Head-Worn Displays: A Review'. Journal of Display Technology, vol. 2, No. 3, Sep. 2006, pp. 199-216.

Caudell, T., et al., "Augmented reality: an application of heads-up display technology to manual manufacturing processes" in Proceedings of Hawaii International Conferences on Systems Sciences (Hawaii, 1992), pp. 659-669.

Cruz-Neira et al., 'Surround-Screen Projection-Based Virtual Reality: the Design and Implementation of the CAVE,' Proceedings of the 20th Annual Conference on Computer Graphics and Interactive Techniques pp. 135-142, ACM SIGGRAPH, ACM Press (1993).

Examination Report dated Apr. 29, 2011 from corresponding GB Application No. GB1012165.5.

H. Hua, C. Gao, and J. P. Rolland, 'Study of the Imaging properties of retroreflective materials used in head-mounted projective displays (HMPDs),' Proc. SPIE4711, 194-201 (2002).

H. Hua, C. Gao, F. Biocca, and J. P. Rolland, "An ultra-light and compact design and implementation of head-mounted projective displays," in Proceedings of IEEE VR 2001, pp. 175-182.

H. Hua, L. Brown, and C. Gao, "A new collaborative infrastructure: SCAPE," in Proceedings of IEEE VR 2003 (IEEE, 2003), pp. 171-179.

H. Hua, L. Brown, and C. Gao, "SCAPE: supporting stereoscopic collaboration in augmented and projective environments," IEEE Comput. Graphics Appl. 24, 66-75 (2004).

H. Hua, L. Brown, and C. Gao, "System and interface framework for SCAPE as a collaborative infrastructure," Presence: Teleoperators and Virtual Environments 13, 234-250 (2004).

H. Hua, Y. Ha, and J. P. Rolland, 'Design of an ultra-light and compact projection lens,' Appl. Opt. 42, 1-12 (2003), pp. 97-107.

H. Hua., A. Girardot, C. Gao. J. P. Rolland. 'Engineering of head-mounted projective displays'. Applied Optics. 39 (22), pp. 3814-3824. (2000).

H. Hua and C. Gao, "A polarized head-mounted projective display," in Proceedings of IEEE and ACM International Symposium on Mixed and Augmented Reality 2005 (IEEE, 2005), pp. 32-35.

Hua et al., 'Design of a Bright Polarized Head-Mounted Projection Display' Applied Optics 46:2600-2610 (2007).

International Search Report dated Mar. 9, 2009 with regard to International Patent Application No. PCT/US2009/031606.

J. L. Pezzaniti and R. A. Chipman, "Angular dependence of polarizing beam-splitter cubes," Appl. Opt. 33, 1916-1929 (1994).

J. P. Rolland, F. Biocca, F. Hamza-Lup, Y. Ha, and R. Martins, "Development of head-mounted projection displays for distributed, collaborative, augmented reality applications," Presence: Teleoperators and Virtual Environments 14, 528-549 (2005).

J. P. Rolland and Hong Hua. "Head-mounted display systems," in Encyclopedia of Optical Engineering. R. Barry Johnson and Ronald O. Driggers, Eds, (2005).

Krueerke, Daniel, "Speed May Give Ferroelectric LCOS Edge in Projection Race," Display Devices Fall '05. Copyright 2005 Dempa Publications, Inc. pp. 29-31.

L. Brown and H. Hua, "Magic lenses for augmented virtual environments," IEEE Comput. Graphics Appl. 26, 64-73 (2006).

L. Davis, J. P. Rolland, F. Hamza-Lup, Y. Ha, J. Norfleet, and C. Imielinska, 'Enabling a continuum of virtual environment experiences,' IEEE Comput. Graphics Appl. 23, pp. 10-12 Mar./Apr. 2003.

M. Inami, N. Kawakami, and S. Tachi, 'Optical camouflage using retro-reflective projection technology,' in Proceedings of ISMAR 2003 {ISMAR, 2003).

M. Inami, N. Kawakami, D. Sekiguchi, Y. Yanagida, T. Maeda, and S. Tachi, "Visuo-haptic display using head-mounted projector," in Proceedings of IEEE Virtual Reality 2000, pp. 233-240.

M. Robinson. J. Chen, and G. Sharp, Polarization Engineering for LCD Projection. John Wiley & Sons, Ltd. England, 2005.

N. Kawakami, M. Inami, D. Sekiguchi, Y. Yangagida, T. Maeda, and S. Tachi, 'Object-oriented displays: a new type of display systemsfrom immersive display to object-oriented displays,' in Proceedings of IEEE Smc 1999, IEEE International Conference on Systems, Man, and Cybernetics, vol. 5, pp. 1066-1069.

R. Azuma, A Survey of Augmented Reality in Presence; Teleoperators and Virtual Environments 6. 4, 355-385, (1997).

R. Kijima, K. Haza, Y. Tada, and T. Ojika, "Distributed display approach using PHMD with infrared camera," in Proceedings of IEEE 2002 Virtual Reality Annual International Symposium (IEEE, 2002), pp. 1-8.

R. Kijima and T. Ojika, "Transition between virtual environment and workstation environment with projective headmounted display," in Proceedings of IEEE VR 1997 (IEEE, 1997), pp. 130-137.

R. Martins, V. Shaoulov, Y. Ha, and J. P. Rolland, "Projection based head-mounted displays for wearable computers," Proc. SPIE 5442, 104-110 (2004).

R. N. Berry, L. A. Riggs, and C. P. Duncan, "The relation of vernier and depth discriminations to field brightness," J. Exp. Psychol. 40, 349-354 (1950).

Rolland, J.P., et al., 'Optical versus video see-through head mounted displays in medical visualization', Presence Teleoperators and Virtual Environments 9, 287-309 (2000).

Winterbottom, M., et al., 'Helmet-Mounted Displays for use in Air Force Training and Simulation', Human Effectiveness Directorate, Nov. 2005, pp. 1-54.

Written Opinion of the International Searching Authority dated Mar. 9, 2009 with regard to International Patent Application No. PCT/US2009/031606.

Y. Ha, H. Hua, R. Martins, and J. P. Rolland, "Design of a wearable wide-angle projection color display," in Proceedings of International Optical Design Conference 2002 (IODC, 2002), pp. 67-73.

Zhang, R., "8.3: Design of a Compact Light Engine for FLCOS Microdisplays in a p-HMPD system", Society for Information Display 2008 International Symposium, Seminar and Exhibition (SID2008), Los Angeles, CA, May 2008.

Zhang, R., et al., "Design of a Polarized Head-Mounted Projection Display Using Ferroelectric Liquid-Crystal-on-Silicon Microdisplays", Applied Optics, vol. 47, No. 15, May 20, 2008, pp. 2888-2896.

Zhang, R., et al., "Design of a Polarized Head-Mounted Projection Display using FLCOS Microdisplays", Proc. of SPIE vol. 6489, 64890B-1. (2007).

"OLED-XL Microdisplays," eMagin 5 pages (2010).

A. Jones, I. McDowall, Yamada H., M. Bolas, P. Debevec, Rendering for an Interactive 360° Light Field Display ACM Transactions on Graphics (TOG)—Proceedings of ACM SIGGRAPH 2007, 26(3), 2007.

A. Malmone, and H. Fuchs, "Computational augmented reality eyeglasses," Proc. of ISMAR 2012.

A. Castro, Y. Frauel, and B. Javidi, "Integral imaging with large depth of field using an asymmetric phase mask," Journal of Optics Express, vol. 15, Issue 16, pp. 10266-10273 (Aug. 2007).

A. T. Duchowski, "Incorporating the viewer's Point-Of-Regard (POR) in gaze-contingent virtual environments", SPIE—Int. Soc. Opt. Eng. Proceedings of Spie—the International Society for Optical Engineering, vol. 3295, 1998, pp. 332-343.

Akeley et al., "A Stereo Display Prototype with Multiple Focal Distances," ACM Trans. Graphics 23:804-813 (2004).

Blundell, B. G., and Schwarz, A. J., "The classification of volumetric display systems: characteristics and predictability of the image space," IEEE Transaction on Visualization and Computer Graphics, 8(1), pp. 66-75, 2002.

C. B. Burckhardt, "Optimum parameters and resolution limitation of integral photography," J. Opt. Soc. Am. 58, 71-76 (1968).

C. Manh Do, R. Mart□ ñez-Cuenca, and B. Javidi, "Three-dimensional object-distortion-tolerant recognition for integral imaging using independent component analysis," Journal of Optical Society of America A 26, issue 2, pp. 245-251 (Feb. 1, 2009).

(56) References Cited

OTHER PUBLICATIONS

Chih-Wei Chen, Myungjin Cho, Yi-Pai Huang, and Bahram Javidi, "Improved viewing zones for projection type integral imaging 3D display using adaptive liquid crystal prism array," IEEE Journal of Display Technology, 2014.

Christopher M. Bishop, Neural Networks for Pattern Recognition, Oxford University Press, Inc. New York, NY 1995.

Curatu, C., J.P. Rolland, and Hong Hua, "Dual purpose lens for an eye-tracked projection head- mounted display," Proceedings of International Optical Design Conference, Vancouver, Canada, Jun. 2006.

D. Cheng, Y.Wang, H. Hua, and M. M. Talha, Design of an optical see-through headmounted display with a low f-number and large field of view using a free-form prism, App. Opt. 48 (14), pp. 2655-2668, 2009.

D. Cheng, Y. Wang, H. Hua, and M. M. Talha, "Design of an optical see-through head-mounted display with a low f-number and large field of view using a freeform prism," Appl. Opt., 48(14):2655-2668, 2009.

D. Cheng, Y. Wang, H. Hua, J. Sasian, "Design of a wide-angle, lightweight head-mounted display using free-form optics tiling," Opt. Lett., 36(11):2098-100, 2011.

D.M. Hoffman, A.R. Girshick, K. Akeley, and M.S. Banks, "Vergence-Accommodation Conflicts Hinder Visual Performance and Cause Visual Fatigue," J. Vision, 8(3), 1-30, (2008).

Davis et al., "Accommodation to Large Disparity Stereograms," Journal of AAPOS 6:377-384 (2002).

Downing et al., "A Three-Color, Solid-State, Three-Dimensional Display," Science 273:1185-1189 (1996).

Duchowski, A., "Eyetracking Methodology: theory and practice," Publisher: Springer, 2003.

Duchowski, A.T., and A. Coltekin, "Foveated gaze-contingent displays for peripheral LOD management, 3D visualization, and stereo imaging," ACM Trans. on Mult. Comp., Comm., and App. 3, 1-21, (2007).

Edgar et al., "Visual Accommodation Problems with Head-Up and Helmet-Mounted Displays?," Displays 15:68-75 (1994).

European Search Report dated Aug. 14, 2015 in corresponding EP application 13740989.2.

F. Okano, H. Hoshino, J. Arai y I. Yuyama, "Real-time pickup method for a three-dimensional image based on integral photography," Appl. Opt. 36, 1598-1603 (1997).

Favalora et al., "100 Million-Voxel Volumetric Display," Proc. SPIE 4712:300-312 (2002).

G. Wetzstein et al., "Tensor Displays: Compressive light field synthesis using multilayer displays with directional backlighting," ACM Transactions on Graphics, 31(4), 2012.

GB Examination Report corresponding to GB 1012165.5 dated Jun. 28, 2011.

Geisler, W.S., J.S. Perry and J. Najemnik, "Visual search: The role of peripheral information measured using gaze-contingent displays," J. Vision 6, 858-873 (2006).

Graham-Rowe, "Liquid Lenses Make a Splash," Nature-Photonics pp. 2-4 (2006).

H. Hua, X. Hu, and C. Gao, "A high-resolution optical see-through head-mounted display with eyetracking capability," Optics Express, Nov. 2013.

H. Hua, "Sunglass-like displays become a reality with freeform optical technology," SPIE Newsroom, 2012.

H. Mukawa, K. Akutsu, I. Matsumura, S. Nakano, T. Yoshida, M. Kuwahara, and K. Aiki, A full-color eyewear display using planar waveguides with reflection volume holograms, J. Soc. Inf. Display 19 (3), pp. 185-193, 2009.

H. Hoshi, N. Taniguchi, H. Morishima, T. Akiyama, S. Yamazaki and A. Okuyama, "Off-axial HMD optical system consisting of aspherical surfaces without rotational symmetry," SPIE vol. 2653, 234 (1996).

H. Hua, C. Pansing, and J.P. Rolland, "Modeling of an eye-imaging system for optimizing illumination schemes in an eye-tracked head-mounted display," Appl. Opt., 46(31):7757-75, Oct. 2007.

H. Hua, P. Krishnaswamy, and J.P. Rolland, 'Video-based eyetracking methods and algorithms in head-mounted displays,' Opt. Express, 14(10):4328-50, May 2006.

Heanue et al., "Volume Holographic Storage and Retrieval of Digital Data," Science 265:749-752 (1994).

Hidenori Kuriyabashi, Munekazu Date, Shiro Suyama, Toyohiko HatadaJ. of the SID 14/5, 2006 pp. 493-498.

Hua, "Merging the Worlds of Atoms and Bits: Augmented Virtual Environments," Optics and Photonics News 17:26-33 (2006).

Hua, H., C. Pansing, and J. P. Rolland, "Modeling of an eye-imaging system for optimizing illumination schemes in an eye-tracked head-mounted display," Applied Optics, 46(32): 1-14, Nov. 2007.

Hua, H. "Integration of eye tracking capability into optical see-through head-mounted displays," Proceedings of SPIE (Electronic Imaging 2001), pp. 496-503, Jan. 2001.

Hua et al, "Compact eyetracked optical see-through head-mounted display", Proc. SPIE 8288, Stereoscopic Displays and Applications XXIII, 82881F (Feb. 9, 2012).

Inoue et al., "Accommodative Responses to Stereoscopic Three-Dimensional Display," Applied Optics, 36:4509-4515 (1997).

International Search Report and Written Opinion dated Nov. 24, 2015 in corresponding PCT application PCT/US2015/047163.

International Search Report dated Feb. 10, 2011 from PCT/CN2010/072376.

International Search Report dated Jan. 29, 2014 in corresponding international application PCT/US2013/065422.

International Search Report dated Jun. 18, 2010 in corresponding international application PCT/US2010/031799.

J. Hong, S. Min, and B. Lee, "Integral floating display systems for augmented reality," Applixed Optics, 51(18):4201-9, 2012.

J. S. Jang and B. Javidi, "Large depth-of-focus time-multiplexed three-dimensional integral imaging by use of lenslets with non-uniform focal lengths and aperture sizes," Opt. Lett. vol. 28, pp. 1924-1926 (2003).

J. Arai, et al., "Depth-control method for integral imaging," Feb. 1, 2008 / vol. 33, No. 3 / Optics Letters.

J. E. Melzer's: 'Overcoming the field-of-view/resolution invariant in head-mounted displays' Proc. SPIE vol. 3362, 1998, p. 284.

J. G. Droessler, D. J. Rotier, "Tilted cat helmet-mounted display," Opt. Eng., vol. 29, 849 (1990).

J. P. Rolland, "Wide-angle, off-axis, see-through head-mounted display," Opt. Eng., vol. 39, 1760 (2000).

J. S. Jang, F. Jin, and B. Javidi, "Three-dimensional integral imaging with large depth of focus by use of real and virtual image fields," Opt. Lett. 28:1421-23, 2003.

J. Y. Son, W.H. Son, S.K. Kim, K.H. Lee, B. Javidi, "Three-Dimensional Imaging for Creating Real-World-Like Environments," Proceedings of IEEE Journal, vol. 101, issue 1, pp. 190-205, Jan. 2013.

Jisoo Hong, et al., "Three-dimensional display technologies of recent interest: Principles, Status, and Issues," Applied Optics (Dec. 1, 2011) 50(34):106.

K. Iwamoto, K. Tanie, T. T. Maeda, "A head-mounted eye movement tracking display and its image display method", Systems & Computers in Japan, vol. 28, No. 7, Jun. 30, 1997, pp. 89-99. Publisher: Scripta Technica, USA.

K. Iwamoto, S. Katsumata, K. Tanie, "An eye movement tracking type head mounted display for virtual reality system:—evaluation experiments of a prototype system", Proceedings of 1994 IEEE International Conference on Systems, Man, and Cybernetics. Humans, Information and Technology (Cat. No. 94CH3571-5). IEEE. Part vol. 1, 1994, pp. 13-18 vol. 1. New York, NY, USA.

Kuiper et al., "Variable-Focus Liquid Lens for Miniature Cameras," Applied Physics Letters 85:1128-1130 (2004).

Kuribayashi, et al., "A Method for Reproducing Apparent Continuous Depth in a Stereoscopic Display Using "Depth-Fused 3D" Technology" Journal of the Society for Information Display 14:493-498 (2006).

L. G. Brown's: 'Applications of the Sensics panoramic HMD' SID Symposium Digest vol. 39, 2008, p. 77.

Laurence R. Young, David Sheena, "Survey of eye movement recording methods", Behavior Research Methods & Instrumentation, 7(5), 397-429, 1975.

(56) References Cited

OTHER PUBLICATIONS

Liu et al., 'A Novel Prototype for an Optical See-Through Head-Mounted Display with Addressable Focus Cues,' IEEE Transactions on Visualization and Computer Graphics 16:381-393 (2010).

Liu et al., "A Systematic Method for Designing Depth-Fused Multi-Focal Plane Three-Dimensional Displays," Optics Express 18:11562-11573 (2010).

Liu et al., "An Optical See-Through head Mounted Display with Addressable Focal Planes," IEEE Computer Society, pp. 33-42 (2008).

Liu et al., "Time-Multiplexed Dual-Focal Plane Head-Mounted Display with a Liquid Lens," Optics Letters 34:1642-1644 (2009).

Loschky, L.C. and Wolverton, G.S., "How late can you update gaze-contingent multiresolutional displays without detection?" ACM Trans. Mult. Comp. Comm. and App. 3, Nov. 2007.

Love et al. (High Speed switchable lens enables the development of a volumetric stereoscopic display. Aug. 2009, Optics Express. vol. 17, No. 18, pp. 15716-15725.).

M. Marti-nez-Corral, H. Navarro, R. Mart☐ ῆez-Cuenca, G. Saavedra, and B. Javidi, "Full parallax 3-D TV with programmable display parameters," Opt. Phot. News 22, 50-50 (2011).

M. D. Missig and G. M. Morris, "Diffractive optics applied to eyepiece design," Appl. Opt. 34, 2452-2461 (1995).

M. Daneshpanah, B. Javidi, and E. Watson, "Three dimensional integral imaging with randomly distributed sensors," Journal of Optics Express, vol. 16, Issue 9, pp. 6368-6377, Apr. 21, 2008.

M. Gutin: 'Automated design and fabrication of ocular optics' Proc. SPIE 2008, p. 7060.

M. L. Thomas, W. P. Siegmund, S. E. Antos, and R. M. Robinson, "Fiber optic development for use on the fiber optic helmet-mounted display", Helmet-Mounted Displays, J. T. Carollo, ed., Proc. SPIE 116, 90-101, 1989.

M. Lucente, "Interactive three-dimensional holographic displays: seeing the future in depth," Computer Graphics, 31(2), pp. 63-67, 1997.

McQuaide et al., "A Retinal Scanning Display System That Produces Multiple Focal Planes with a Deformable Membrane Mirror," Displays 24:65-72 (2003).

Mon-Williams et al., "Binocular Vision in a Virtual World: Visual Deficits Following the Wearing of a Head-Mounted Display," Ophthalmic Physiol. Opt. 13:387-391 (1993).

O. Cakmakci, B. Moore, H. Foroosh, and J. P. Rolland, "Optimal local shape description for rotationally non-symmetric optical surface design and analysis," Opt. Express 16, 1583-1589 (2008).

Optical Research Associates, http://www.optica1res.com, 2 pages (obtained Jan. 26, 2011).

P. A. Blanche, et al., "Holographic three-dimensional telepresence using large-area photorefractive polymer", Nature, 468, 80-83, Nov. 2010.

P. Gabbur, H. Hua, and K. Barnard, 'A fast connected components labeling algorithm for real-time pupil detection,' Mach. Vision Appl., 21(5):779-787, 2010.

R. MartÃ?Â-nez-Cuenca, H. Navarro, G. Saavedra, B. Javidi, and M. MartÃ?Â-nez-Corral, "Enhanced viewing-angle integral imaging by multiple-axis telecentric relay system," Optics Express, vol. 15, Issue 24, pp. 16255-16260, Nov. 21, 2007.

R. Schulein, C. Do, and B. Javidi, "Distortion-tolerant 3D recognition of underwater objects using neural networks," Journal of Optical Society of America A, vol. 27, No. 3, pp. 461-468, Mar. 2010.

R. Schulein, M. DaneshPanah, and B. Javidi, "3D imaging with axially distributed sensing," Journal of Optics Letters, vol. 34, Issue 13, pp. 2012-2014, Jul. 1, 2009.

R.J. Jacob, "The use of eye movements in human-computer interaction techniques: what you look at is what you get", ACM Transactions on Information Systems, 9(2), 152-69, 1991.

Reingold, E.M., L.C. Loschky, G.W. McConkie and D.M. Stampe, "Gaze-contingent multiresolutional displays: An integrative review," Hum. Factors 45, 307-328 (2003).

Rolland, J. P., A. Yoshida, L. D. Davis and J. H. Reif, "High-resolution inset head-mounted display," Appl. Opt. 37, 4183-93 (1998).

Rolland et al., "Multifocal Planes Head-Mounted Displays," Applied Optics 39:3209-3215 (2000).

S. Bagheri and B. Javidi, "Extension of Depth of Field Using Amplitude and Phase Modulation of the Pupil Function," Journal of Optics Letters, vol. 33, No. 7, pp. 757-759, Apr. 1, 2008.

S. Hong, J. Jang, and B. Javidi,"Three-dimensional volumetric object reconstruction using computational integral imaging," Journal of Optics Express, on-line Journal of the Optical Society of America, vol. 12, No. 3, pp. 483-491, Feb. 9, 2004.

S. Hong and B. Javidi, "Distortion-tolerant 3D recognition of occluded objects using computational integral imaging," Journal of Optics Express, vol. 14, Issue 25, pp. 12085-12095, Dec. 11, 2006.

S. Kishk and B. Javidi, "Improved Resolution 3D Object Sensing and Recognition using time multiplexed Computational Integral Imaging," Optics Express, on-line Journal of the Optical Society of America, vol. 11, No. 26, pp. 3528-3541, Dec. 29, 2003.

Schowengerdt, B. T., and Seibel, E. J., "True 3-D scanned voxel displays using single or multiple light sources," Journal of SID, 14(2), pp. 135-143, 2006.

Schowengerdt et al., "True 3-D Scanned Voxel Displays Using Single or Multiple Light Sources," J. Soc. Info. Display 14:135-143 (2006).

Sheedy et al., "Performance and Comfort on Near-Eye Computer Displays," Optometry and Vision Science 79:306-312 (2002).

Shibata et al., "Stereoscopic 3-D Display with Optical Correction for the Reduction of the Discrepancy Between Accommodation and Convergence," Journal of the Society for Information Display 13:665-671 (2005).

Shiwa et al., "Proposal for a 3-D Display with Accommodative Compensation: 3DDAC," Journal of the Society for Information Display 4:255-261 (1996).

Sullivan, "A Solid-State Multi-Planar Volumetric Display," SID Symposium Digest of Technical Papers 34:354-356 (2003).

Suyama, S., Ohtsuka, S., Takada, H., Uehira, K., and Sakai, S., "Apparent 3D image perceived from luminance-modulated two 2D images displayed at different depths," Vision Research, 44: 785-793, 2004.

T. Okoshi, "Optimum design and depth resolution of lens-sheet and projection-type three-dimensional displays," Appl. Opt. 10, 2284-2291 (1971).

T. Ando, K. Yamasaki, M. Okamoto, and E. Shimizu, "Head Mounted Display using holographic optical element," Proc. SPIE, vol. 3293, 183 (1998).

Tibor Balogh, "The HoloVizio System," Proceedings of SPIE, vol. 6055, 2006.

Varioptic, "Video Auto Focus and Optical Image Stabilization," http://vvww.varioptic.com/en/home.html, 2 pages (2008).

Wann et al., Natural Problems for Stereoscopic Depth Perception in Virtual Environments, Vision Res. 35:2731-2736 (1995).

Wartenberg, Philipp, "EyeCatcher, the Bi-directional OLED Microdisplay," Proc. of SID 2011.

Watt et al., "Focus Cues Affect Perceived Depth," J Vision 5:834-862 (2005).

Written Opinion dated Feb. 10, 2011 from PCT/CN2010/072376.

Written Opinion dated Jun. 18, 2010 in corresponding international application PCT/US2010/031799.

X. Hu and H. Hua, "Design and assessment of a depth-fused multi-focal-plane display prototype," Journal of Display Technology, Dec. 2013.

Xiao Xiao, Bahram Javidi, Manuel Martinez-Corral, and Adrian Stern , "Advances in Three-Dimensional Integral Imaging: Sensing, Display, and Applications," Applied Optics, 52(4):. 546-560,2013.

Xin Shen, Yu-Jen Wang, Hung-Shan Chen, Xiao Xiao, Yi-Hsin Lin, and Bahram Javidi, "Extended depth-of-focus 3D micro integral imaging display using a bifocal liquid crystal lens," Optics Letters, vol. 40, issue 4, pp. 538-541 (Feb. 9, 2015).

Xinda Hu and Hong Hua, "High-resolution optical see-through multi-focal-plane head-mounted display using freeform optics," Optics Express,22(11): 13896-13903, Jun. 2014.

(56) References Cited

OTHER PUBLICATIONS

Y. Takaki, Y. Urano, S. Kashiwada, H. Ando, and K. Nakamura, "Super multi-view winshield display for long-distance image information presentation," Opt. Express, 19, 704-16, 2011.
Yamazaki et al, "Thin wide-field-of-view HMD with free-form-surface prism and applications", Proc. SPIE 3639, Stereoscopic Displays and Virtual Reality Systems VI, 453 (May 24, 1999).
Yano, S., Emoto, M., Mitsuhashi, T., and Thwaites, H., "A study of visual fatigue and visual comfort for 3D HDTV/HDTV images," Displays, 23(4), pp. 191-201, 2002.
S. Feiner, 2002, "Augmented reality: A new way of seeing," Scientific American, No. 54, 2002.
K. Ukai and P.A. Howardth, "Visual fatigue caused by viewing stereoscopic motion images: background, theories, and observations," Displays, 29(2), pp. 106-116, 2008.
B. T. Schowengerdt, M. Murari, E. J. Seibel, "Volumetric display using scanned fiber array," SID Symposium Digest of Technical Papers, 2010.
H. Hua and B. Javidi, "A 3D integral imaging optical see-through head-mounted display", Optics Express, 22(11): 13484-13491, 2014.
W. Song, Y. Wang. D. Cheng, Y. Liu, "Light field head-mounted display with correct focus cue using micro structure array," Chinese Optics Letters, 12(6): 060010, 2014.
T. Peterka, R. Kooima, D. Sandin, A. Johnson, J. Leigh, T. DeFanti, "Advances in the Dynallax solid-state dynamic parallax barrier autostereoscopi visualization display system," IEEE Trans. Visua. Comp. Graphics, 14(3): 487-499, 2008.
Hu, X., Development of the Depth-Fused Multi-Focal Plane Display Technology, Ph.D. Dissertation, College of Optical Sciences, University of Arizona, 2014.
S. Ravikumar, K. Akeley, and M. S. Banks, "Creating effective focus cues in multi-plane 3D displays," Opt. Express 19, 20940-20952, 2011.
X. Hu and H. Hua, "Design and tolerance of a free-form optical system for an optical see-hrough multi-focal-plane display," Applied Optics, 54(33): 9990-9, 2015.
A. Yabe, "Representation of freeform surface suitable for optimization," Applied Optics, 2012.
Armitage, David, Ian Underwood, and Shin-Tson Wu. Introduction to Microdisplays. Chichester, England: Wiley, 2006.
European Search Report dated Apr. 28, 2016 from EP application 13847218.8.
Hoshi, et al, "Off-axial HMD optical system consisting of aspherical surfaces without rotational symmetry," Proc. SPIE 2653, Stereoscopic Displays and Virtual Reality Systems III, 234 (Apr. 10, 1996).
Hu and Hua, "Design and tolerance of a freeform optical system for an optical see-through multi-focal plane display," Applied Optics, 2015.
Xinda Hu et al: "48.1: Distinguished Student Paper: A Depth-Fused Multi-Focal-Plane Display Prototype Enabling Focus Cues in StereoscopicDisplays", SID International Symposium. Digest of Technical Papers, vol. 42, No. I, Jun. 1, 2011 (Jun. 1, 2011), pp. 691-694, XP055266326.
Dewen Cheng et al.; "Large field-of-view and high resolution free-form head-mounted display"; SPIE-OSA/ vol. 7652 Jun. 2018.
G. Lippmann, "Epreuves reversibles donnant la sensation du relief," Journal of Physics (Paris) 7, 821-825 (1908).
Xin et al., "Design of Secondary Optics for IRED in active night vision systems," Jan. 10, 2013, vol. 21, No. 1, Optics Express, pp. 1113-1120.
S. Nikzad, Q. Yu, A. L. Smith, T. J. Jones, T. A. Tombrello, S. T. Elliott, "Direct detection and imaging of low-energy electrons with delta-doped charge-coupled devices," Applied Physics Letters, vol. 73, p. 3417, 1998.
Huang et al., "An integral-imaging-based head-mounted light field display using a tunable lens ,;1nd aperture array." Journal of the Society for Information Display Mar. 1, 2017; p. 199-201.
Full Certified Translation of Reference JP008160345.
Full Certified Translation of Reference JP 02200074.

\* cited by examiner

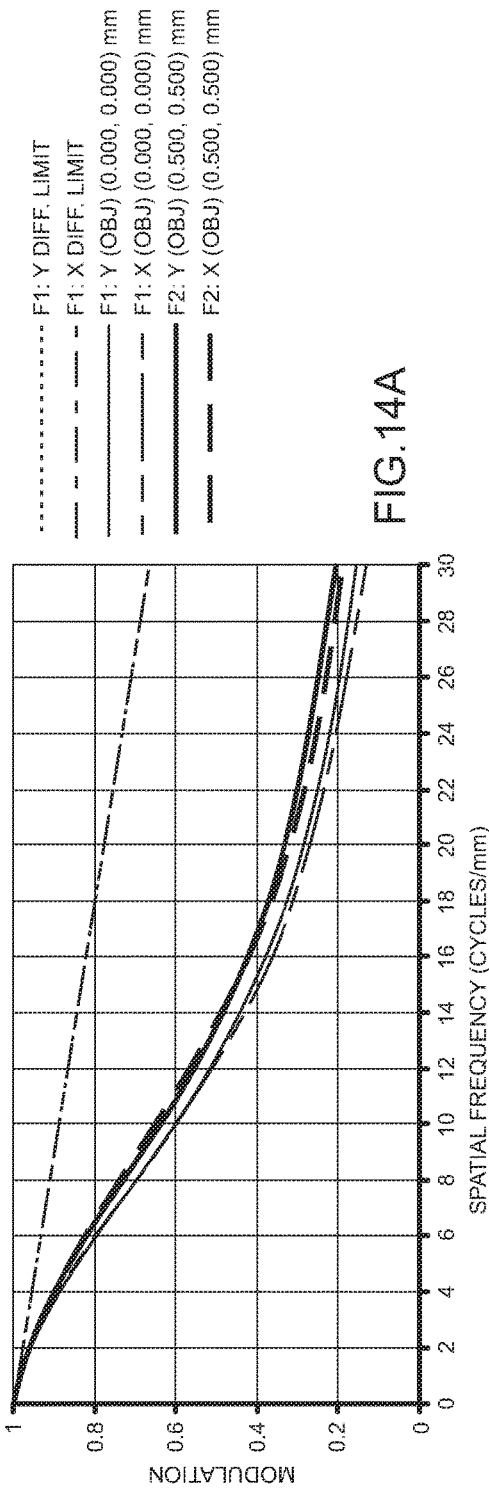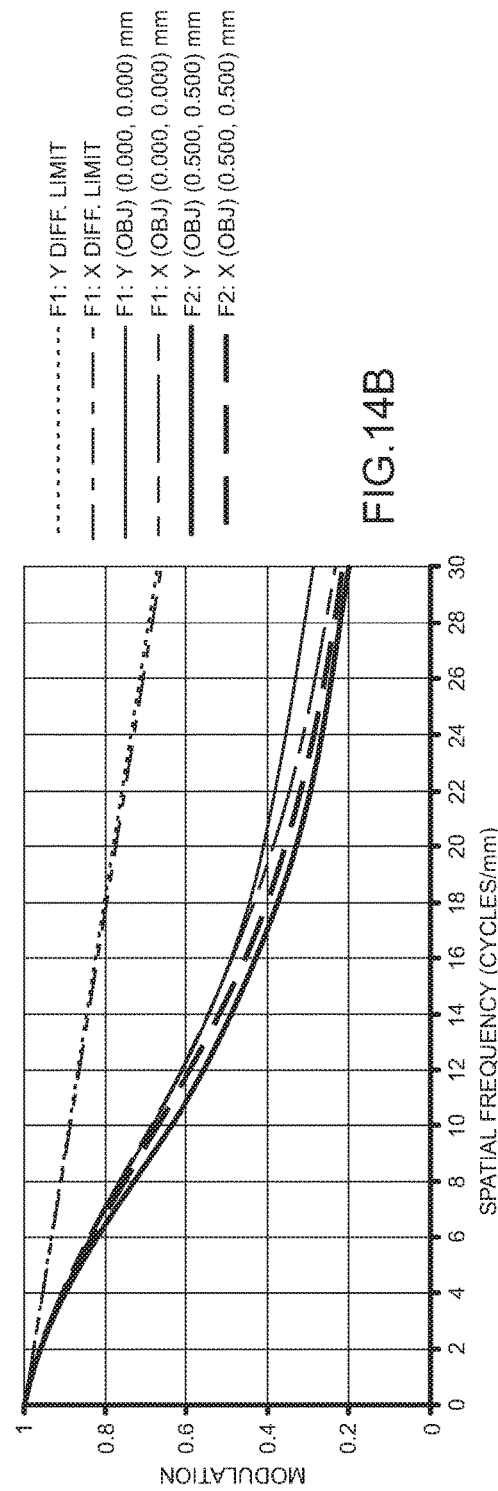

HEAD-MOUNTED LIGHT FIELD DISPLAY WITH INTEGRAL IMAGING AND WAVEGUIDE PRISM

RELATED APPLICATIONS

This application is a national stage application under 35 U.S.C. 371 for International Application No. PCT/US2018/21089 filed Mar. 6, 2018, which claims the benefit of priority of U.S. Provisional Application No. 62/469,100, filed on Mar. 9, 2017, the entire contents of which application are incorporated herein by reference.

GOVERNMENT LICENSE RIGHTS

This invention was made with government support under Grant No. 1422653 awarded by the NSF. The government has certain rights in the invention.

FIELD OF THE INVENTION

The present invention relates generally to the field of head-mounted displays, and more particularly, but not exclusively to head-mounted displays based on integral imaging (InI).

BACKGROUND

Head-mounted displays (HMD), also commonly known as near-to-eye displays (NED) or head-worn displays (HWD), have gained significant interest in recent years and stimulated tremendous efforts to push the technology forward for a broad range of consumer applications. For instance, a lightweight optical see-through HMD (OST-HMD), which enables optical superposition of digital information onto a user's direct view of the physical world and maintains see-through vision to the real-world, is one of the key enabling technologies to augmented reality (AR) applications. A wide field-of-view (FOV), immersive HMD, which immerses a user in computer-generated virtual world or a high-resolution video capture of a remote real-world, is a key enabling technology to virtual reality (VR) applications. HMDs find a myriad of applications in gaming, simulation and training, defense, education, and other fields.

Despite the high promises and the tremendous progress made recently toward the development of both VR and AR displays, minimizing visual discomfort involved in wearing HMDs for an extended period remains an unresolved challenge. One of the key contributing factors to visual discomfort is the vergence-accommodation conflicts (VAC) due to the lack of the ability to render correct focus cues, including accommodation cue and retinal image blur effects. The VAC problem in HMDs stems from the fact that the image source is mostly a 2D flat surface located at a fixed distance from the eye. FIG. 1 shows a schematic layout of a typical monocular HMD, which mainly includes a 2D microdisplay as the image source and an eyepiece that magnifies the image rendered on the microdisplay and forms a virtual image appearing at a fixed distance from the eye. An OST-HMD requires an optical combiner (e.g. beamsplitter) placed in front of the eye to combine the optical paths of the virtual display and real scene. The conventional HMDs, whether monocular or binocular, see-through or immersive, lack the ability to render correct focus cues for the digital information which may appear at other distances than that corresponding to the virtual image plane. As a result, conventional HMDs fail to stimulate natural eye accommodation response and retinal blurry effects. The problem of lacking correct focus cues in HMDs causes several visual cue conflicts. For instance, a conventional stereoscopic HMD stimulates the perception of 3D space and shapes from a pair of two-dimensional (2D) perspective images, one for each eye, with binocular disparities and other pictorial depth cues of a 3D scene seen from two slightly different viewing positions. Therefore, conventional stereoscopic HMDs force an unnatural decoupling of the accommodation and convergence cues. The cue for the accommodation depth is dictated by the depth of the 2D image plane while the convergence depth of the 3D scene is dictated by the binocular disparities rendered by the image pair. The retinal image blurring cues for virtual objects rendered by the display is mismatched from those created by the natural scene. Many studies have provided strong supportive evidence that these conflicting visual cues related to incorrectly rendered focus cues in conventional HMDs may contribute to various visual artifacts and degraded visual performance.

Several approaches proposed previously may overcome the drawbacks of conventional stereoscopic displays, including volumetric displays, super-multi-view auto-stereoscopic displays, Integral-Imaging-based displays, holographic displays, multi-focal-plane displays, and computational multi-layer displays. Due to their enormous hardware complexity, many of these different display methods are not suitable for implementation in HMD systems. On the other hand, the multi-focal-plane display, integral-imaging, and computational multi-layer approaches are commonly referred to be light field displays and are suitable for head-mounted applications. Their use in HMDs is referred to as head-mounted light field displays.

Head-mounted light field displays render a true 3D scene by sampling either the projections of the 3D scene at different depths or the directions of the light rays apparently emitted by the 3D scene and viewed from different eye positions. They are capable of rendering correct or nearly correct focus cues and addressing the vergence-accommodation mismatch problem in conventional VR and AR displays. For instance, an integral imaging (InI) based display reconstructs the light fields of a 3D scene by angularly sampling the directions of the light rays apparently emitted by the 3D scene and viewed from different eye positions. As illustrated in FIG. 2, a simple InI-based display typically includes a display panel and a 2D array which can be a microlens array (MLA) or pinhole array. The display renders a set of 2D elemental images, each of which represents a different perspective of a 3D scene. The conical ray bundles emitted by the corresponding pixels in the elemental images intersect and integrally create the perception of a 3D scene that appears to emit light and occupy the 3D space. The InI-based display using 2D arrays allows the reconstruction of a 3D shape with full-parallax information in both horizontal and vertical directions, which is its main difference from the conventional auto-stereoscopic displays with only horizontal parallax using one-dimensional parallax barriers or cylindrical lenticular lenses. Since its publication by Lippmann in 1908, the InI-based technique has been widely explored for both capturing the light fields of real scenes and for its use in eyewear-free auto-stereoscopic displays. It has been known for its limitations in low lateral and longitudinal resolutions, narrow depth of field (DOF), and narrow view angle. Compared with all other non-stereoscopic 3D display techniques, the simple optical architecture of an InI technique makes it attractive to integrate with HMD optical system and create a wearable light field display.

However, like other integral-imaging based display and imaging technologies, the current InI-based HMD method suffers from several major limitations: (1) narrow field of view (<30° diagonally); (2) low lateral resolution (about 10 arc minutes in the visual space); (3) low longitudinal resolution (about 0.5 diopters in the visual space); (4) narrow depth of field (DOF) (about 1 diopter for a 10-arc minute resolution criteria); (5) limited eyebox for crosstalk-free viewing (<5 mm); and (6) limited resolution of viewing angle (>20 arc minutes per viewing). These limitations not only create significant barriers for adopting the technologies as high-performance solutions, but also potentially undermine the effectiveness of the technology for addressing the accommodation-convergence discrepancy problem.

Thus, the present disclosure details methods, design and embodiment of a high-performance head-mounted light field display based on integral imaging that overcomes some aspects of the performance limits of the state of the art summarized above.

SUMMARY

In response to the challenges described above, in one of its aspects the present invention provides a high-performance HMD based on integral imaging that offers high lateral and longitudinal resolutions, large depth of field, cross-talk free eyebox, and increased viewing angle resolution.

To this end, the present invention may provide a freeform waveguide prism for imaging a lightfield disposed at a selected point, comprising a first freeform optical surface disposed to receive light from the lightfield and refract the received light into the body of the prism; a second freeform optical surface disposed to receive the refracted light from the first freeform optical surface and reflect the light into the body of the prism to provide an intermediate image of the lightfield at a selected location within the body of the prism; a third freeform optical surface disposed to receive the light from the intermediate image and total internally reflect the light into the body of the prism; and a fourth freeform optical surface disposed to receive the reflected light from the third freeform optical surface and reflect the light back to the third freeform surface at an angle that allows the light to exit the prism, the first through fourth freeform optical surfaces cooperating so that the light exiting the prism through the third freeform surface produces an image of the light field at a selected location external to the prism. The second freeform optical surface may be configured to total internally reflect the light into the body of the prism, and the third freeform optical surface may be configured to total internally reflect the light from the second freeform optical surface into the body of the prism. For an orthogonal X-Y-Z coordinate system, the Z-axis may be along the viewing direction, the Y-axis may be parallel to the horizontal direction aligned with interpupilary direction of a user, and the X-axis may be in the vertical direction aligning with the head orientation of the user. The freeform waveguide prism may be symmetric about the horizontal (Y-Z) plane, and the first through fourth freeform optical surfaces may be decentered along the horizontal Y-axis and rotated about the vertical X-axis.

In addition, the present invention may provide a head-mounted display integral imaging (InI) system, comprising: a microscopic InI unit (micro-InI) configured to create light fields of a selected 3D scene at a selected position along an optical axis of the system; a relay unit having a vari-focal element (VFE) disposed therein, the relay unit disposed on the optical axis at a location so the selected position is an optical conjugate of the relay unit, the relay unit configured to receive the light fields created by the microscopic InI unit; and the freeform waveguide prism according for receiving light from the relay unit to provide an image of the 3D scene at an exit pupil of the system for viewing by a user of the head-mounted display system, wherein the VFE is configured to tune the location of the intermediate image within the body of the prism. The microscopic InI unit (micro-InI) may be configured to reproduce full-parallax light fields of a 3D scene having a constrained viewing zone. The relay unit may include a first lens group with the VFE located at a back focal length of the first lens group. The field of view of the system may be independent of the optical power of the VFE, and the VFE may be disposed on the optical axis at a location such that the compound optical power of the relay unit is maintained constant, independent of the optical power of the VFE. The microscopic InI unit may include a microdisplay and the subtended field angle of the microdisplay through the freeform waveguide prism may be maintained constant, independent of the optical power of the VFE. The focal length of the freeform waveguide prism may be 27.5 mm, the diagonal field of view of the system may be 35°, and the system may have an optical resolution as high as 2 arc minutes per pixel.

BRIEF DESCRIPTION OF THE DRAWINGS

The foregoing summary and the following detailed description of exemplary embodiments of the present invention may be further understood when read in conjunction with the appended drawings, in which:

FIGS. 14A, 14B illustrate MTF plots for the reconstruction points shifted away from CDP by 1 diopter for fields on-axis to the MLA (FIG. 14A) and for fields for the furthest MLA element near the edge of the MLA (FIG. 14B)

DETAILED DESCRIPTION

Figure 1:
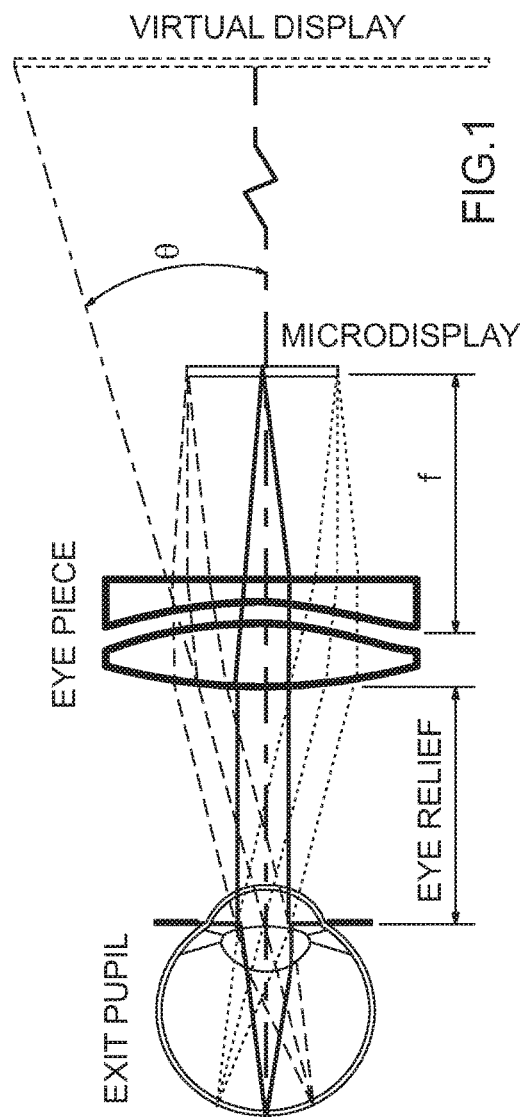
FIG. 1 schematically illustrates a conventional, monocular HMD in which an eyepiece magnifies the image rendered on a microdisplay and forms a virtual display appearing at a fixed, far distance from the eye.
Figure 2:
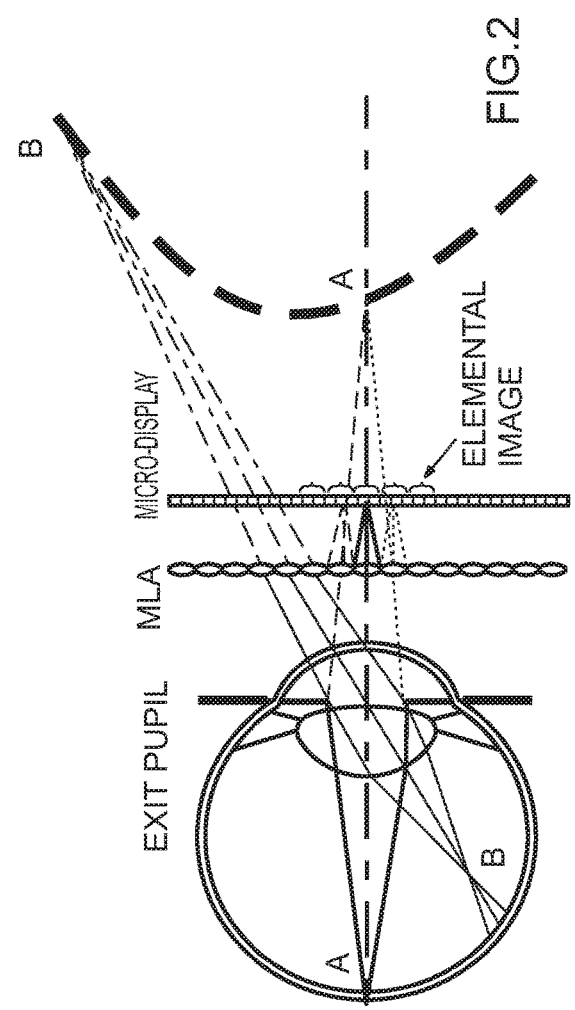
FIG. 2 schematically illustrates a near-eye light field display based on integral imaging.
Figure 3A:
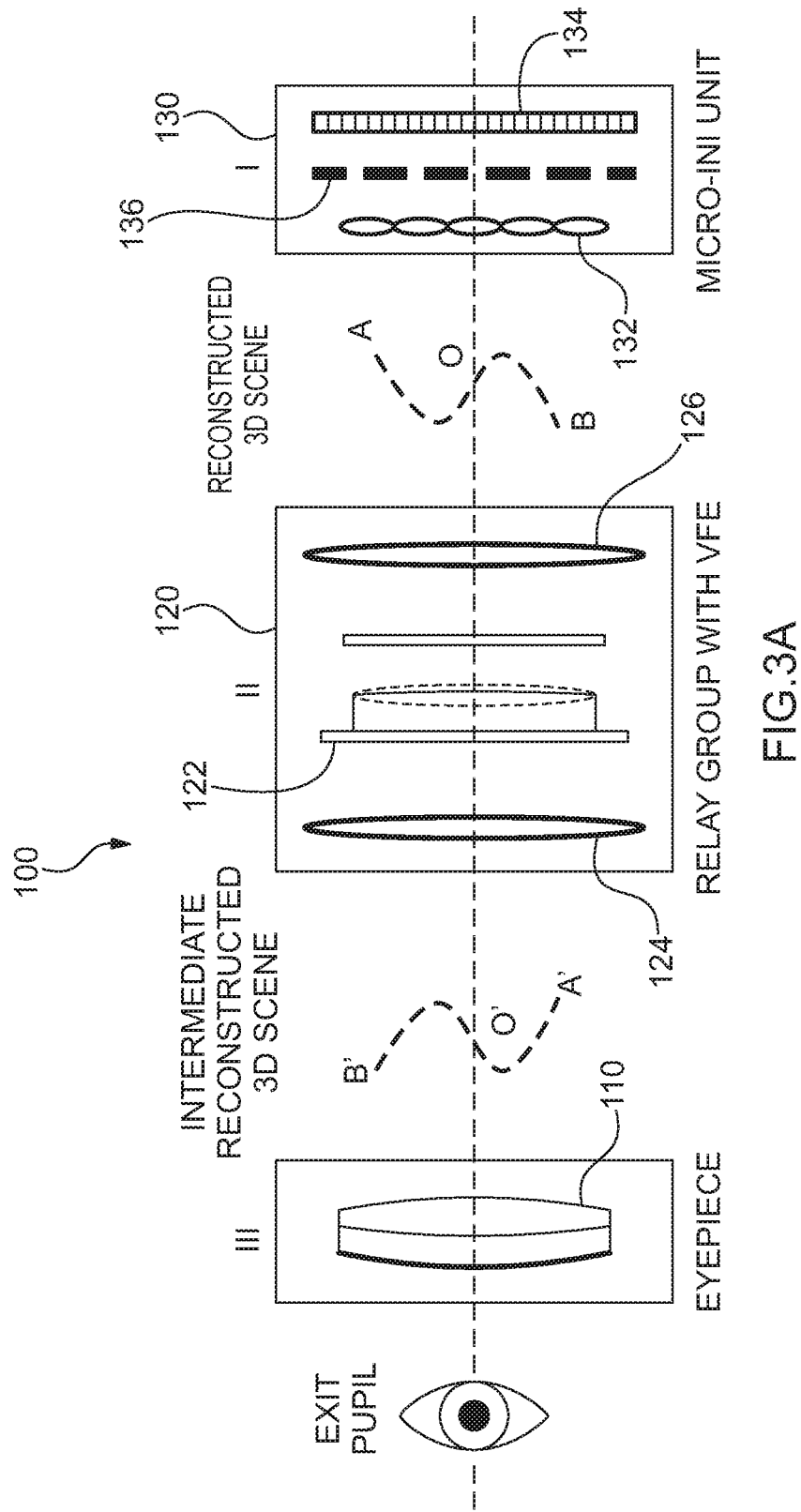
FIG. 3A schematically illustrates an exemplary configuration of a high-performance InI-based head-mounted light field display in accordance with the present invention.
Figure 3B:
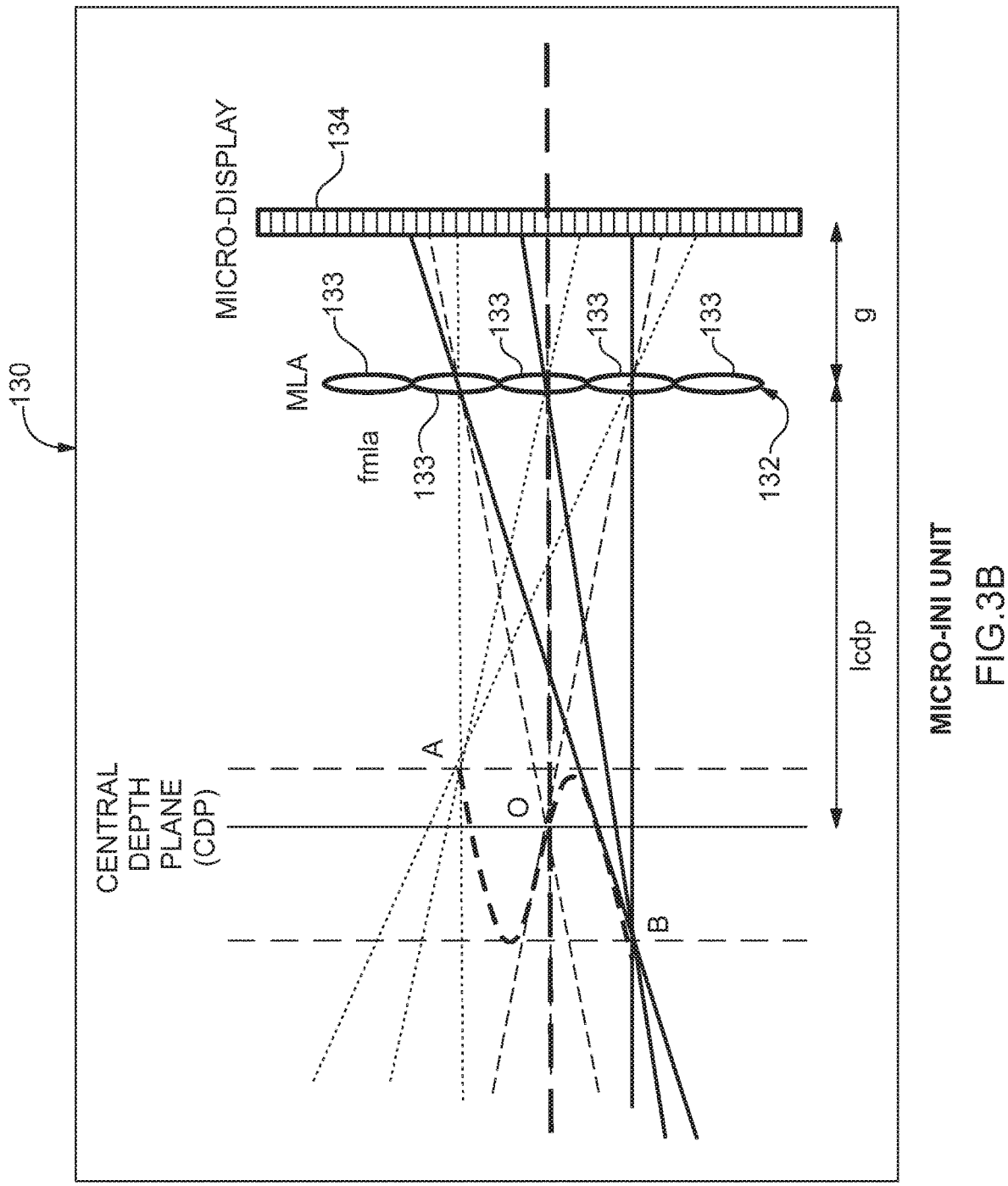
FIG. 3B schematically illustrates an exemplary configuration of a micro-InI unit in accordance with the present invention.

Referring now to the figures, wherein like elements are numbered alike throughout, as shown in FIG. 3A, a HMD system 100 in accordance with the present invention may include three key subsystems: I) a microscopic InI unit (micro-InI) 130, II) a relay group 120 with a vari-focal element (VFE) 122 disposed therein for receiving the light fields from the InI unit 130, and III) eyepiece optics 110 for receiving the tuned intermediate 3D scene from the relay group 120. As illustrated in FIG. 3B, the micro-InI unit 130 can reproduce the full-parallax light fields of a 3D scene seen from a constrained viewing zone, where the full-parallax light fields offer the change of view perspectives of a 3D scene from both horizontal and vertical viewing directions. The constrained viewing zone optically corresponds to limiting the aperture of the micro-InI unit 130, and the constrained viewing zone is optically conjugate to the exit pupil of the display system 100 where a viewer's eye is placed to view the reconstructed 3D scene. The relay group 120 creates an intermediate image of the 3D scene reconstructed by the micro-InI unit 130 with a tunable position of its central depth plane (CDP). Depending on the magnification power of the eyepiece 110, the position of the CDP may be tunable in the range from about 0.5 mm to as large as hundreds of millimeters to create the perception of a 3D scene with a large depth range spanning from the optical infinity (0 diopter) to as close as 20 cm (5 diopters). The relay group 120 may also facilitate the flip of the concavity of the reconstructed 3D scene AOB. The eyepiece optics 110 reimages the tunable 3D light fields into a viewer's eye and enlarges the tunable depth range of the 3D light fields into a large depth volume spacing from meters far to as close as a few centimeters. A see-through unit (not shown), which may be optics with a beamsplitter function, may optically communicate with the eyepiece optics 110 to optically enable non-obtrusive view of a real-world scene if a see-through view is desired. The micro-InI unit 130 of FIG. 3A, as further illustrated in FIG. 3B, may include a high-resolution microdisplay and a micro-lens array (MLA) 132. The focal length of the lenslets 133 in the MLA 132 is denoted as $f_{MLA}$ and the gap between the microdisplay 134 and the MLA 132 is noted as g. A set of 2D elemental images, each representing a different perspective of a 3D scene AOB, may be displayed on the high-resolution microdisplay 134. Through the MLA 132, each elemental image works as a spatially-incoherent object and the conical ray bundles emitted by the pixels in the elemental images intersect and integrally create the perception of a 3D scene that appears to emit light and occupy the 3D space. The central depth plane (CDP) of the reconstructed miniature scene, with a depth range of $z_0$, is located by the distance $l_{cdp}$ measured from the MLA 132. Such an InI system 130 allows the reconstruction of a 3D surface shape AOB with parallax information in both horizontal and vertical directions. The light field of the reconstructed 3D scene (i.e., the curve AOB in FIG. 3B) may be optically coupled into eyepiece optics 110 via the relay group 120 for viewing by a user. In a resolution priority InI system ($f_{MLA} \neq g$), the central depth plane CDP of the reconstructed 3D scene is optically conjugate to the microdisplay 134 and its location is given by $$l_{cdp} = g M_{MLA}, \quad (1)$$

Where $M_{MLA}$ is the magnification of the micro-InI unit 130, which may be expressed by $$M_{MLA} = \frac{f_{MLA}}{g - f_{MLA}}. \quad (2)$$

Figure 4B:
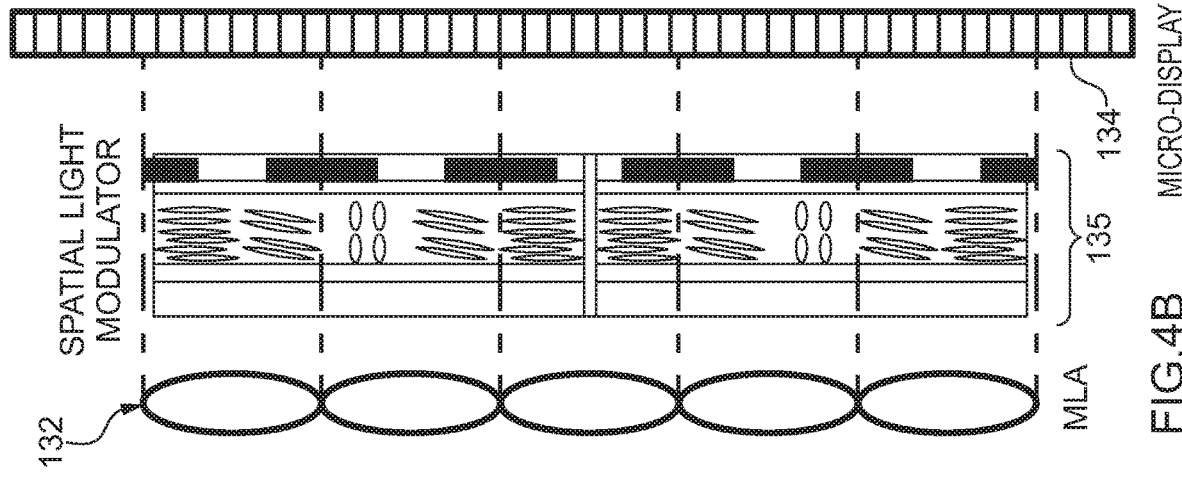
FIGS. 4A-4D schematically illustrate an exemplary configuration of a micro-InI unit in accordance with the present invention constructed to provide ray direction control by using: an aperture array (FIG. 4A), programmable spatial light modulator (FIG. 4B), a display source with controllable directional emissions engine (FIG. 4C); and a backlight source with a spatial light modulator as an exemplary controllable directional emissions engine (FIG. 4D)
Figure 4A:
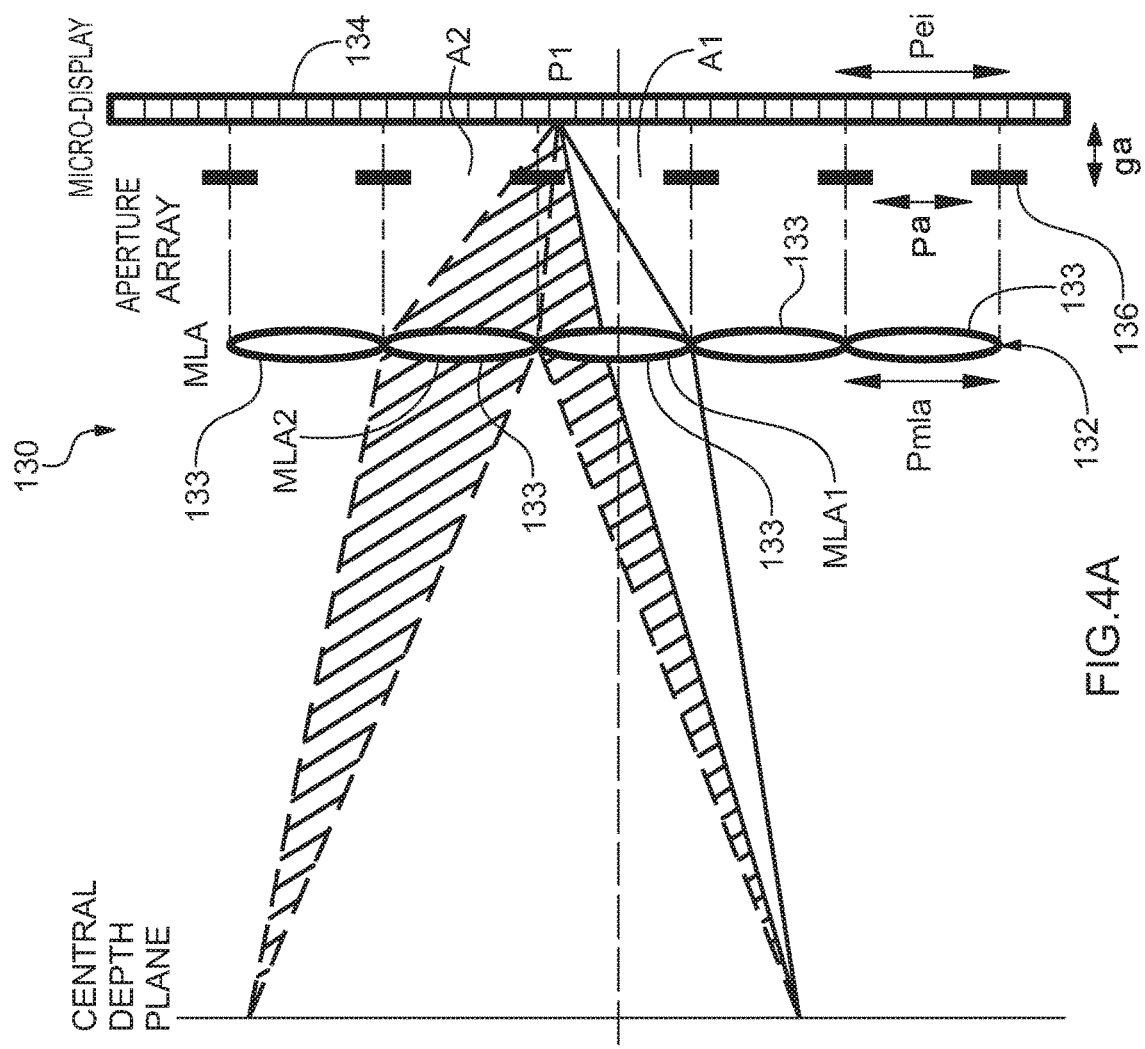

As shown in FIGS. 3A, 4A, optionally, an aperture array 136, including a group of ray-limiting apertures that matches the pitch of the MLA 132, may be inserted between the microdisplay 134 and MLA 132. The small aperture corresponding to each microlens 133 allows rays within the designed viewing window to propagate through the optics and reach the eyebox while blocking unwanted rays from reaching an adjacent microlens 133 or while blocking rays from neighboring elemental images to reach a microlens 133. For instance, the black zone between the aperture A1 and A2 blocks the dashed rays originated from point P1 from reaching the MLA2 adjacent to the lenslet MLA1. These blocked rays are typically the main source of view cross-talk and ghost images observed in an InI display system. The distance from the microdisplay 134 to the aperture array 136 is denoted as $g_a$ and the diameter of aperture opening is denoted as $p_a$, which may be constrained by $$g_a \leq g_{a-max} = g \frac{p_{ei}}{p_{ei} + p_{mla}}, \quad (3)$$

$$p_a \leq p_{a-max} = p_{ei} \frac{(g_{a-max} - g_a)}{g_{a-max}}, \quad (4)$$

Where $g_{a\text{-}max}$ and $p_{a\text{-}max}$ are the maximum allowable gap and aperture size, respectively, $p_{ei}$ is the dimension of the elemental image, and $p_{mla}$ is the pitch of the MLA 132.

Figure 4D:
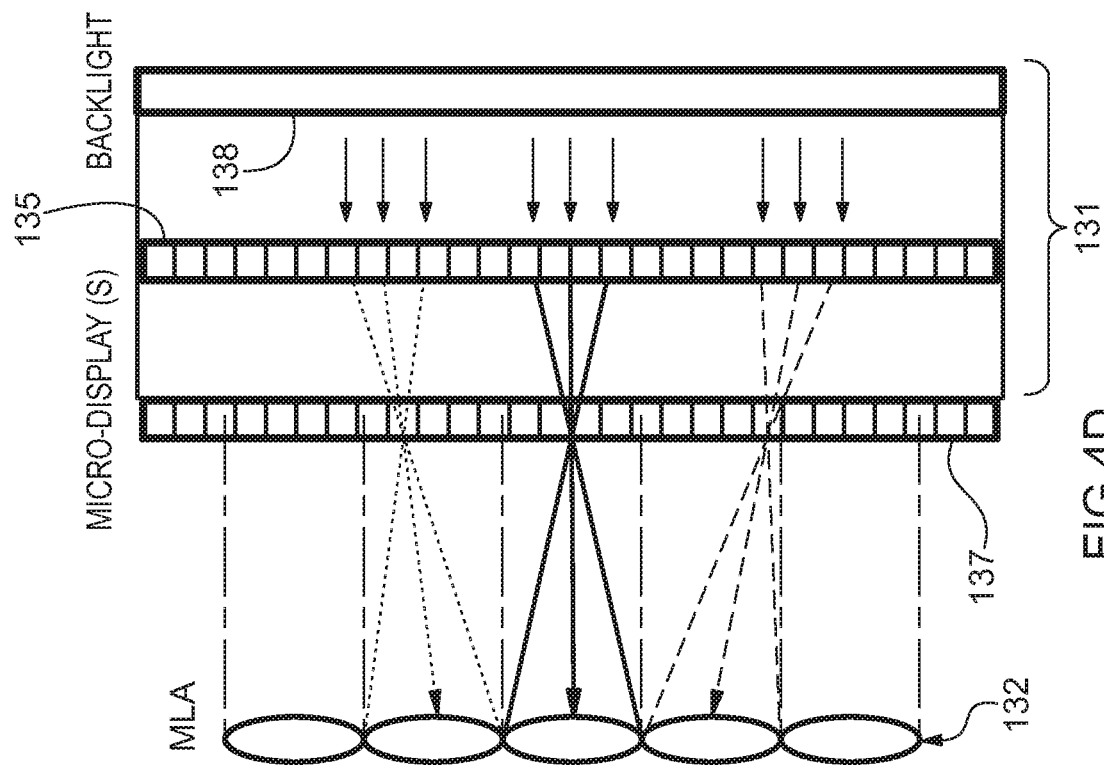
Figure 4C:
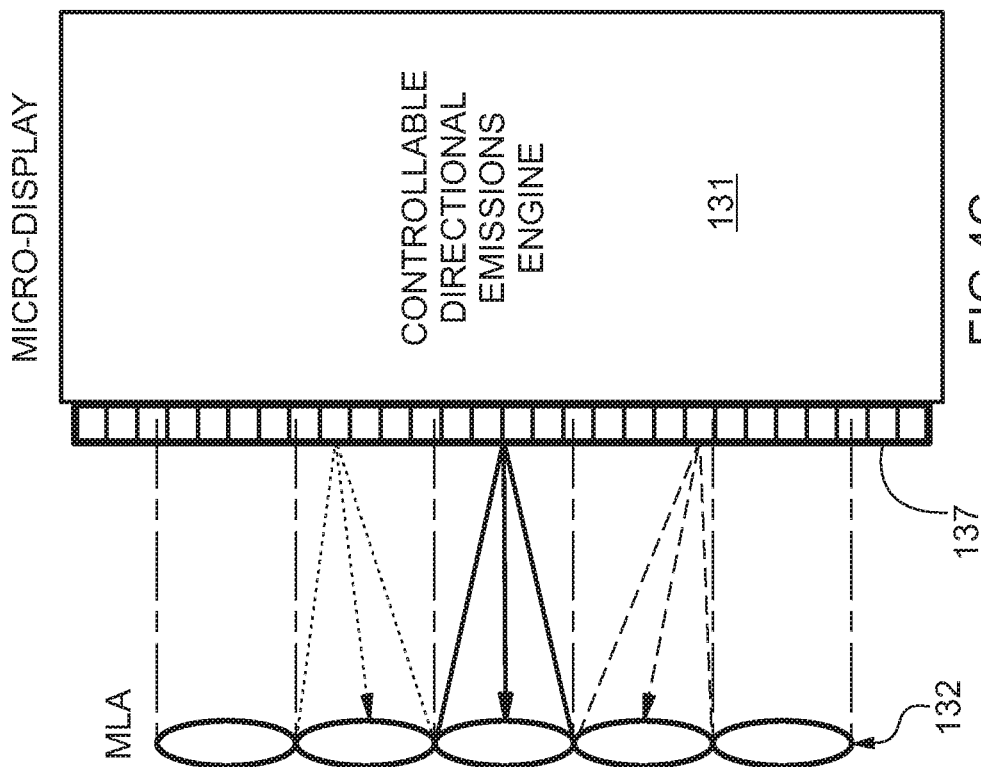

One drawback in using an aperture array 136 with a fixed aperture size is that it can partially block rays for pixels located near the edge of each elemental images if the size of the elemental image changes. As illustrated in FIG. 4A, a small part of the rays from point P1 which are supposed to propagate through lenslet MLA1 are blocked by the black zone between aperture A1 and aperture A2, causing vignetting-like effects such that viewer may observe reduction of image brightness for points near the edge of each elemental images. FIG. 4B shows an alternative configuration to that of FIG. 4A in which the aperture array 136 is replaced by a programmable spatial light modulator (SLM) 135 so that the size and shape of each aperture can be dynamically adapted to avoid partially blocking desired rays. FIG. 4C shows another embodiment of a micro-InI unit in accordance with the present invention in which the microdisplay 134 and aperture array 136 are replaced by a display source 131 with controllable directional emissions, where the light emission direction can be controlled precisely so that the rays from each pixel will only reach their corresponding MLA lenslet 133. FIG. 4D demonstrates one possible configuration of such display source 131 where a spatial light modulator 135 is inserted between a backlight source 138 with non-direction emission and non-self-emissive microdisplay 137. The spatial light modulator 135 may be set to program and control the cone angle of the rays that illuminate the microdisplay 137 and reach the MLA 132.

A conventional InI-based display system can typically suffer from a limited depth of field (DOF) due to the rapid degradation of spatial resolution as the depths of 3D reconstruction points shift away from that of the CDP. For instance, the 3D scene volume may need to be limited to less than 0.5 diopters in order to maintain a spatial resolution of 3 arc minutes or better in the visual space. In order to render a much larger 3D scene volume while maintaining a high spatial resolution, such as in the exemplary configuration of FIG. 3A, a relay group 120 with an electronically-controlled vari-focal element 122 sandwiched inside is inserted between the micro-InI 130 and the eyepiece 110. Exemplary VFE's 122 include liquid lenses, liquid crystal lenses, deformable mirrors, or any other tunable optical technology, such as electrically tunable optical technology. By dynamically controlling the optical power, $\varphi_R$, of the relay group 120 by applying different voltages to the VFE 122, the relay group 120 forms an intermediate image A'O'B' of the reconstructed miniature 3D scene created by the micro-InI 130. The central depth position CDP of the relayed intermediate scene is tunable axially (along the optical axis) with respect to the eyepiece 110. As a result, the depth volume of the magnified 3D virtual scene by the eyepiece 110 can be shifted axially from very close (e.g. 5 diopters) to very far (e.g. 0 diopter) while maintaining high lateral and longitudinal resolutions.

Figure 5:
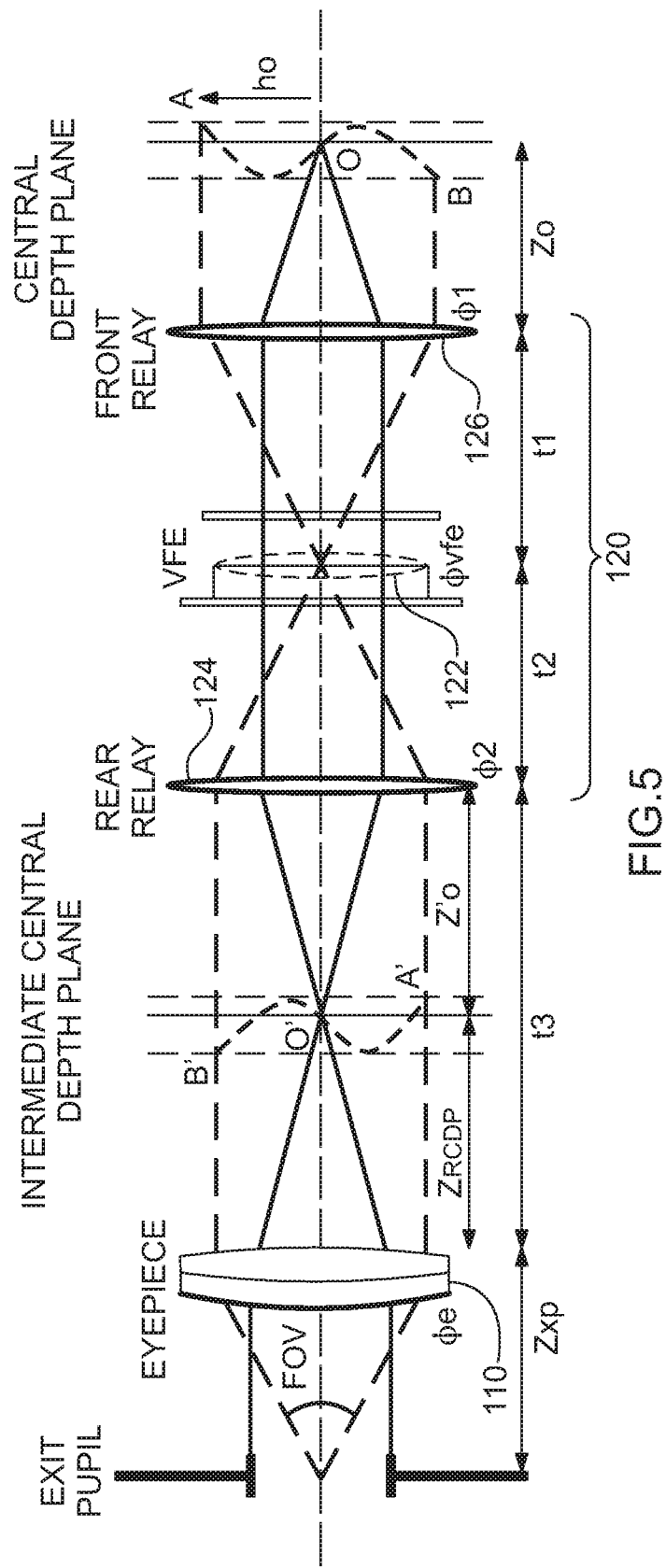
FIG. 5 schematically illustrates an exemplary configuration of a relay group in accordance with the present invention with a VFE (vari-focal element) placed at a position conjugate to the exit pupil of the eyepiece.

FIG. 5 schematically illustrates an exemplary configuration of the vari-focal relay group 120, such as the relay group 120 of FIG. 3A, including a front lens group "Front Relay" 126 adjacent to the micro-InI unit 130, VFE optics 122 located in the middle functioning as the system stop, and rear lens group "Rear Relay" 124 adjacent to the eyepiece 110. The compound power, $\varphi_R$, of the relay group 120 is given by $$\varphi_R = \varphi_1 + \varphi_2 \varphi_{vfe} - \varphi_1 \varphi_2 (t_1 + t_2) - \varphi_{vfe}(\varphi_1 t_1 + \varphi_2 t_2) + \varphi_{vfe} \varphi_1 \varphi_2 t_1 t_2 \qquad (4)$$

Where $\varphi_1$, $\varphi_{VFE}$, and $\varphi_2$ are the optical power of the front lens group 126, VFE 122, and the rear lens group 124, respectively. $t_1$ and $t_2$ are the spaces between the front lens group 126 and VFE 122 and between the VFE 122 and the rear lens group 124. $z_0$ is the axial distance between the front lens group and the 3D scene reconstructed by the micro-InI unit 130. The axial position of the relayed intermediate scene is given by $$z'_0 = -\frac{1}{\frac{(1-z_0\varphi_1)-[z_0+(1-z_0\varphi_1)t_1]\varphi_{vfe}}{[z_0+(1-z_0\varphi_1)t_1]+\{(1-z_0\varphi_1)-[z_0+(1-z_0\varphi_1)t_1]\varphi_{vfe}\}t_2}\varphi_2} \qquad (5)$$

The lateral magnification of the vari-focal relay system is given by $$M_R = \frac{1}{(1-z_0\varphi_1)-[z_0+(1-z_0\varphi_1)t_1]\varphi_{vfe} - \{[z_0+(1-z_0\varphi_1)t_1]+[(1-z_0\varphi_1)-[z_0+(1-z_0\varphi_1)t_1]\varphi_{vfe}]t_2\}\varphi_2} \qquad (6)$$

Assuming $\varphi_e$ is the optical power of the eyepiece 110 and $Z_{RCDP}$ is the distance from the relayed CDP to the eyepiece 110, the apparent CDP position of the reconstructed 3D virtual scene through the eyepiece 110 is given by $$z'_{RCDP} = \frac{1}{\varphi_e - \frac{1}{z_{RCDP}}} \qquad (7)$$

The lateral magnification of the entire system through the eyepiece 110 is given by $$M_t = \left| M_{MLA} \cdot M_R \cdot \frac{z'_{RCDP}}{z_{RCDP}} \right| \qquad (8)$$

The field of view (FOV) of the entire system through the eyepiece 110 is given by, $$FOV = 2\tan^{-1}\frac{h_0}{[h_{vfe}+(u_{vfe}-h_{vfe}\varphi_{vfe})t_1]+\{(u_{vfe}-h_{vfe}\varphi_{vfe})-[h_{vfe}+(u_{vfe}-h_{vfe}\varphi_{vfe})t_1]\varphi_1\}z_0} \qquad (9)$$

Where $t_3$ is the spacing between the eyepiece 110 and rear relay lens 124; $z_{xp}$ is the spacing between the exit pupil and the eyepiece 110; $h_0$ is the image height of the reconstructed scene, and we further define $u_{vfe}=[(1-z_{xp}\varphi_e)-(z_{xp}+(1-z_{xp}\varphi_e)t_3)\varphi_2]$, and $h_{vfe}=[(1-z_{xp}\varphi_e)-(z_{xp}+(1-z_{xp}\varphi_e)t_3)\varphi_2]-[(z_{xp}+(1-z_{xp}\varphi_e)t_3)\varphi_2+((1-z_{xp}\varphi_e)-(z_{xp}+(1-z_{xp}\varphi_e)t_3)\varphi_2)t_2$.

When the VFE 122 is set to be an optical conjugate to the exit pupil of the eyepiece 110 ((i.e. $h_{vfe}=0$) where the entrance pupil of the eye is placed to view the display 134, we have $h_{vfe}=0$ and the FOV is independent of the optical power of the VFE 122. The equation in Eq. (9) is simplified into:

$$FOV = 2\tan^{-1}\frac{h_0}{u_{vfe}t_1 + [u_{vfe} - u_{vfe}t_1\varphi_1]z_0} \quad (10)$$

As illustrated in FIG. 5, a preferred embodiment of the vari-focal relay group 120 is the placement of the VFE 122 at the back focal length of the front relay group 26 (i.e. $t_1=1/\varphi_1$) to make the VFE 122 an optical conjugate to the exit pupil of the eyepiece 110 ((i.e. $h_{vfe}=0$). With this preferred embodiment, the compound power, $\varphi_R$, of the relay group 120 given by Eq. (4) is simplified into:

$$\varphi_R = \varphi_1 - \varphi_1\varphi_2 t_2 \quad (11)$$

The lateral magnification of the vari-focal relay system given by Eq. (6) is simplified into $$M_R = \frac{1}{(1-z_0\varphi_R) - \frac{\varphi_{vfe}(1-\varphi_2 t_2) + \varphi_2(1+\varphi_1 t_1)}{\varphi_1}} \quad (12)$$

And so does the lateral magnification of the entire system given by Eq. (8).
When $t_1=1/\varphi_1$ and $h_{vfe}=0$, the FOV of the system is further simplified into $$FOV = 2\tan^{-1}\frac{h_0\varphi_1}{u_{vfe}} \quad (13)$$

As demonstrated by Eqs. (10) through (13), the careful position of the VFE 122 in the preferred manner ensures that the compound optical power of the relay group 120 is maintained constant, independent of the optical power of the VFE 122 due to constant chief ray directions owing to the property of object-space telecentricity. As further demonstrated by Eq. (13), the subtended field angle of the display through the eyepiece 110 is further maintained constant, independent of the optical power of the VFE 122. Maintaining a constant optical power for the relay group 120 helps the virtually reconstructed 3D scene achieve constant field of view regardless of the focal depths of the CDP. Therefore a much larger volume of a 3D scene could be visually perceived without seams or artifacts in a gaze-contingent or time-multiplexing mode. It is worth noting that the lateral magnification of the relay group 120 given by Eq. (12) can be further maintained constant if $t_2=1/\varphi_2$ is satisfied, which makes the vari-focal relay group 120 a double-telecentric system.

The eyepiece 110 in FIG. 3A can take many different forms. For instance, to achieve a compact optical design of an optical see-through HMD, a wedge-shaped freeform prism can be adopted, through which the 3D scene reconstructed by the micro-InI unit 130 and relay group 120 is magnified and viewed. To enable see-through capability for AR systems, a freeform corrector lens with one of the surfaces coated with beamsplitter coating can be attached to the freeform prism eyepiece to correct the viewing axis deviation and undesirable aberrations introduced by the freeform prism to the real-world scene.

Figure 6A:
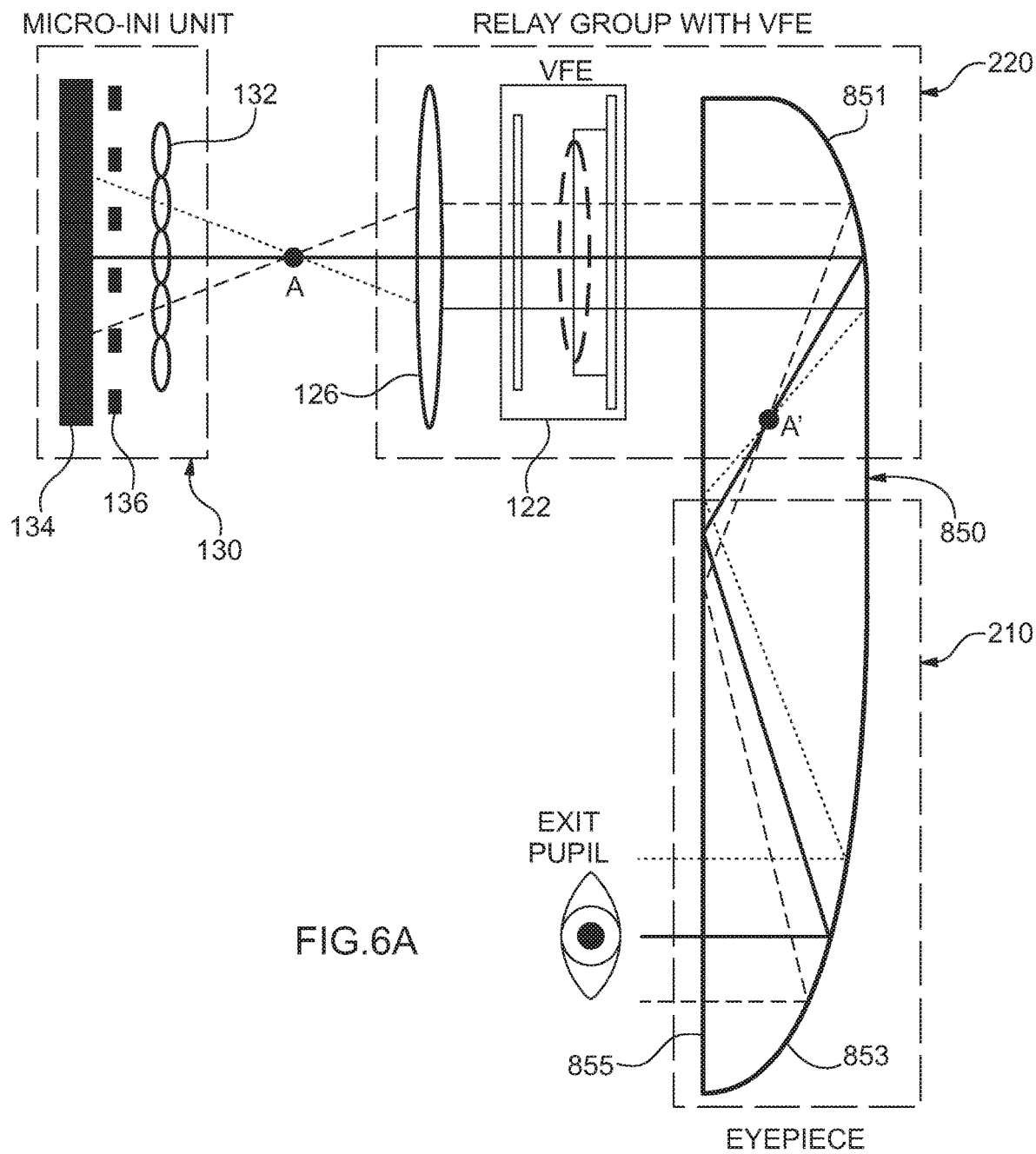
FIGS. 6A-6D schematically illustrate an exemplary configuration of an optical see-through InI-HMD design in accordance with the present invention using a freeform waveguide prism where part of the vari-focal relay group is incorporated into the eyepiece, with FIG. 6A showing the display path layout, FIG. 6B showing the see-through view layout, FIG. 6C showing a segmented rear surface of the waveguide prism for extended see-through view, and FIG. 6D showing a front view of the rear surface of the waveguide prism.

In another aspect of the present invention, part of the relay group 120 may be incorporated into the eyepiece optics 110, such as freeform eyepiece, such that the tunable intermediate 3D scene is formed inside the freeform eyepiece. In such a context, the eyepiece may be a wedge-shaped freeform waveguide prism, for example. FIG. 6A schematically illustrates the concept of a freeform waveguide-like prism 850 formed by multiple freeform optical surfaces. The exit pupil is located where the use's eye is placed to view the magnified 3D scene. In the design, part of a traditional relay group 220 following the VFE 122 is incorporated into the prism 850 and fulfilled by the top portion 851 of the freeform waveguide prism 850 contained within the box labeled "Relay Group with VFE." A light ray emitted from a 3D point (e.g. A) is first refracted by a closest optical element 126 of the relay group 220 and transmitted into the prism 850, followed by a reflection by one or multiple freeform surfaces to create an intermediate image (e.g. A'). The axial position of the intermediate image (e.g. A') is tunable by the VFE 122. Multiple consecutive reflections by the subsequent surfaces and a final refraction through the exit surface 855 allow the ray reaching the exit pupil of the system. Multiple bundles of rays from different elemental images may exist, but do so apparently from the same object point, each of which bundles represents a different view of the object, impinging on different locations of the exit pupil. These ray bundles integrally reconstruct a virtual 3D point (e.g. "A") located in front of the eye. Rather than requiring multiple optical elements, the optical path is naturally folded within a multi-surface prism 850, which helps reduce the overall volume and weight of the optics substantially when compared with designs using rotationally symmetric elements. Compared with a design using a traditional wedge-shaped 3-surface prism, the waveguide-like eyepiece design incorporates part of the relay function, enabling a much more compact system than combining a standalone relay group 120 with a 3-surface prism. Besides the advantage of compactness, the waveguide-like multi-fold eyepiece design offers a much more favorable form factor, because it enables the ability to fold the remaining relay group and micro-InI unit horizontally to the temple sides. The multiple folding not only yields a much more weight-balanced system, but also enables a substantially larger see-through FOV than using a wedge-shaped prism.

Figure 6B:
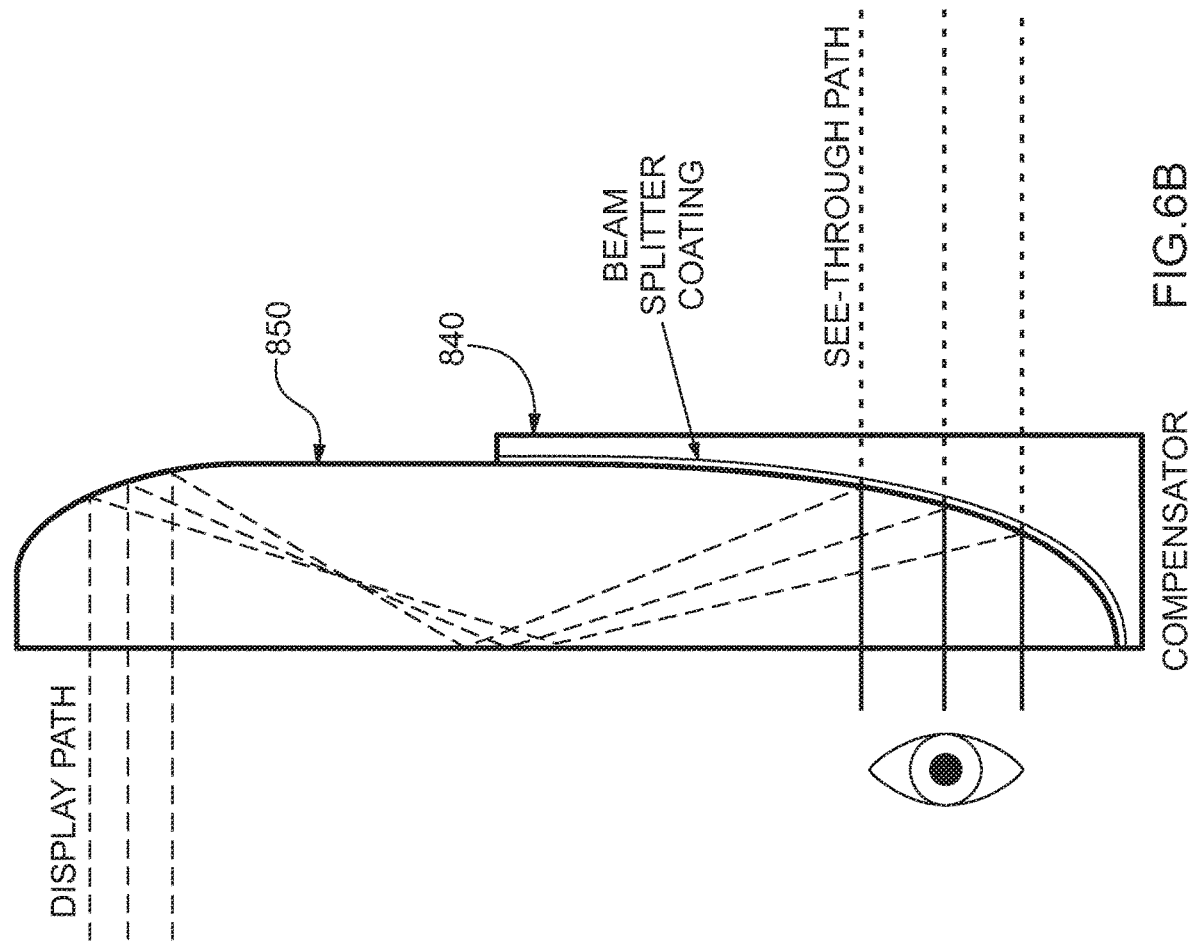

To enable see-through capability for AR systems, the bottom part 853 of the rear surface, marked as the eyepiece portion, of the prism 850 in FIG. 6A can be coated as a beamsplitting mirror, and a freeform corrector lens 840 including at least two freeform optical surfaces, may be attached to the rear surface of the prism 850 to correct the viewing axis deviation and undesirable aberrations introduced by the freeform prism 850 to the real-world scene. The see-through schematic layout is shown in FIG. 6B. The rays from the virtual light field are reflected by the rear surface of the prism 850 while the rays from a real-world scene are transmitted through the freeform corrector lens 840 and prism 850. The front surface of the freeform corrector lens 840 matches the shape of the rear surface of the prism 850. The back surface of the freeform corrector lens 840 may be optimized to minimize the shift and distortion introduced to the rays from a real-world scene when the lens is combined with the prism 850. The additional corrector lens "compensator" does not noticeably increase the footprint and weight of the overall system.

Figure 6D:
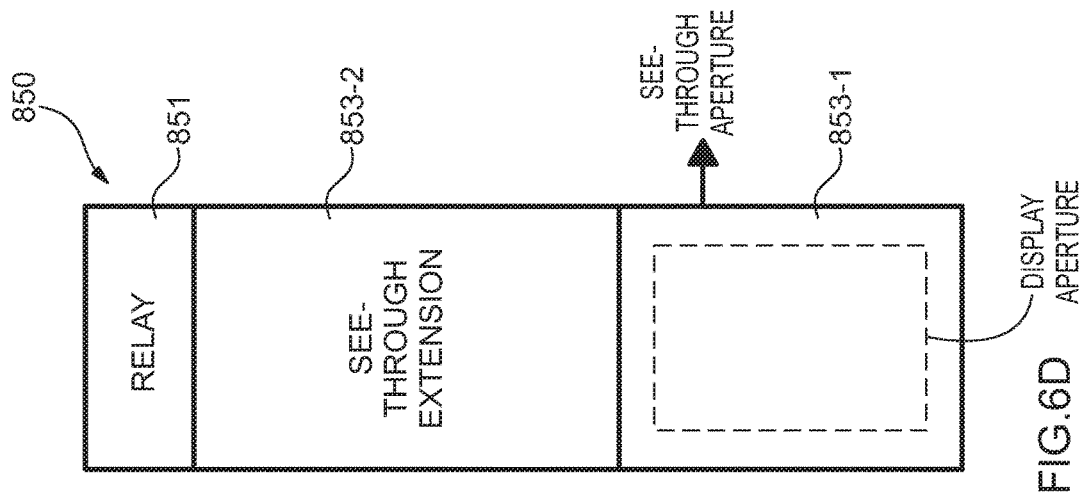
Figure 6C:
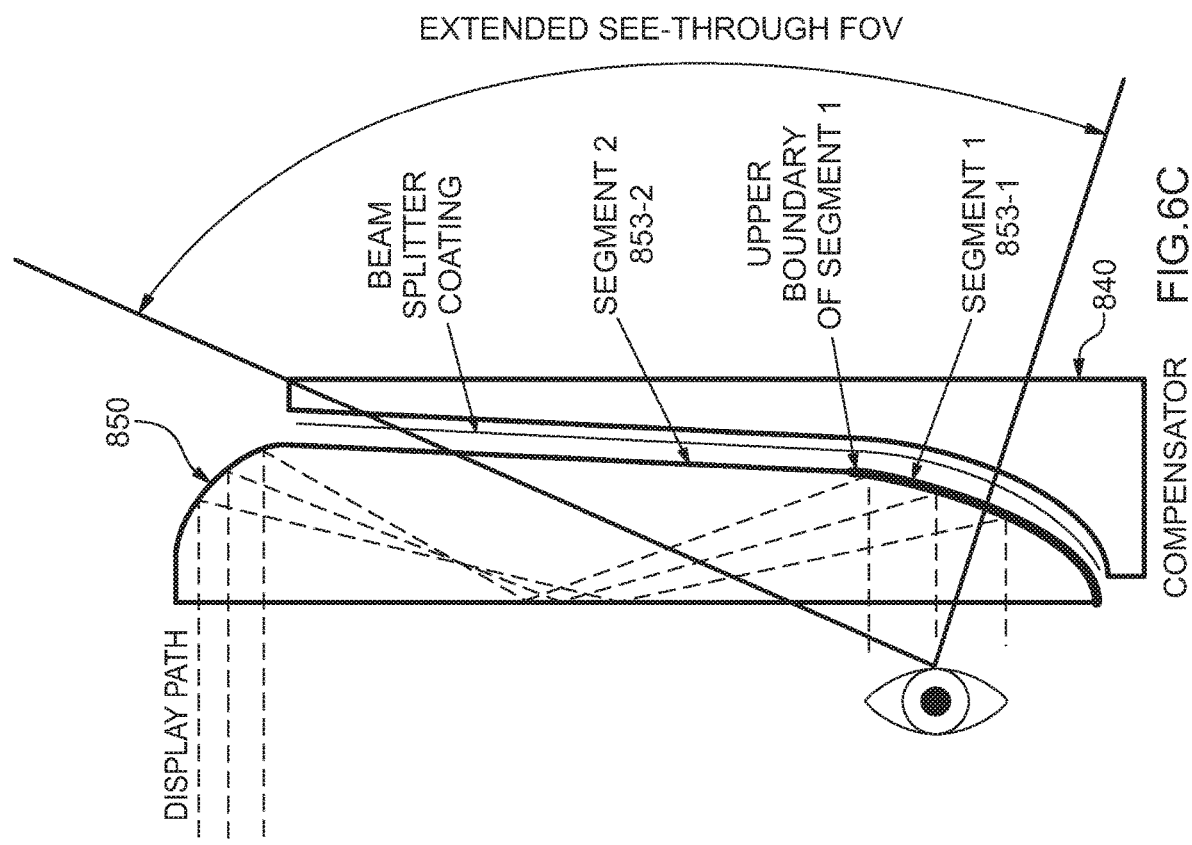

In another aspect of the present invention, the bottom part 853 of the rear surface, marked as the eyepiece portion, of the prism 850 in FIG. 6A may be divided into two segments, the segment 853-1 and the segment 853-2. As schematically illustrated in FIG. 6C, the segment of 853-1 may be a reflective or partial reflective surface which receives the light fields generated by the micro-InI unit. A beamsplitting mirror coating on the segment of 853-1 also allows the transmission of the light rays from a real-world scene. The segment 853-2 is a transmissive or semi-transmissive surface which only receives the light rays from a real-world scene, while it does not receive the light fields generated by the micro-InI unit 130. FIG. 6D schematically illustrates a front view of the rear surface of the prism 850. The two surface segments, 853-1 and 853-2, intersect at an upper boundary of the aperture window required to receive the reconstructed 3D light fields by the micro-InI unit 130, and they may be made by two separate freeform surfaces. The division of the bottom part of the rear surface 853 into two separate segments 853-1, 853-2 with different light paths provides the ability to substantially enlarge the FOV of the see-through view beyond the FOV of the display path without being subject to the constraints of the virtual display path. As shown in FIG. 6C, a freeform corrector lens 840 may be attached to the rear surface of the prism 850 to correct the viewing axis deviation and undesirable aberrations introduced by the freeform prism 850 to the real-world scene. The rays from the virtual light field are reflected by the segment 853-1 of the rear surface of the prism 850 while the rays from a real-world scene are transmitted through both the segments 853-1 and 853-2 of the prism 850 and the freeform corrector lens 840. The surface segment 853-2 may be optimized to minimize visual artifacts of see-through view when it is combined with the freeform corrector lens 840. The front surface of the freeform corrector lens 840 matches the shape of the surface segments 853-1 and 853-2 of the prism 850. The back surface of the freeform corrector lens 840 may be optimized to minimize the shift and distortion introduced to the rays from a real-world scene when the freeform corrector lens 840 is combined with the prism 850.

Figure 7A:
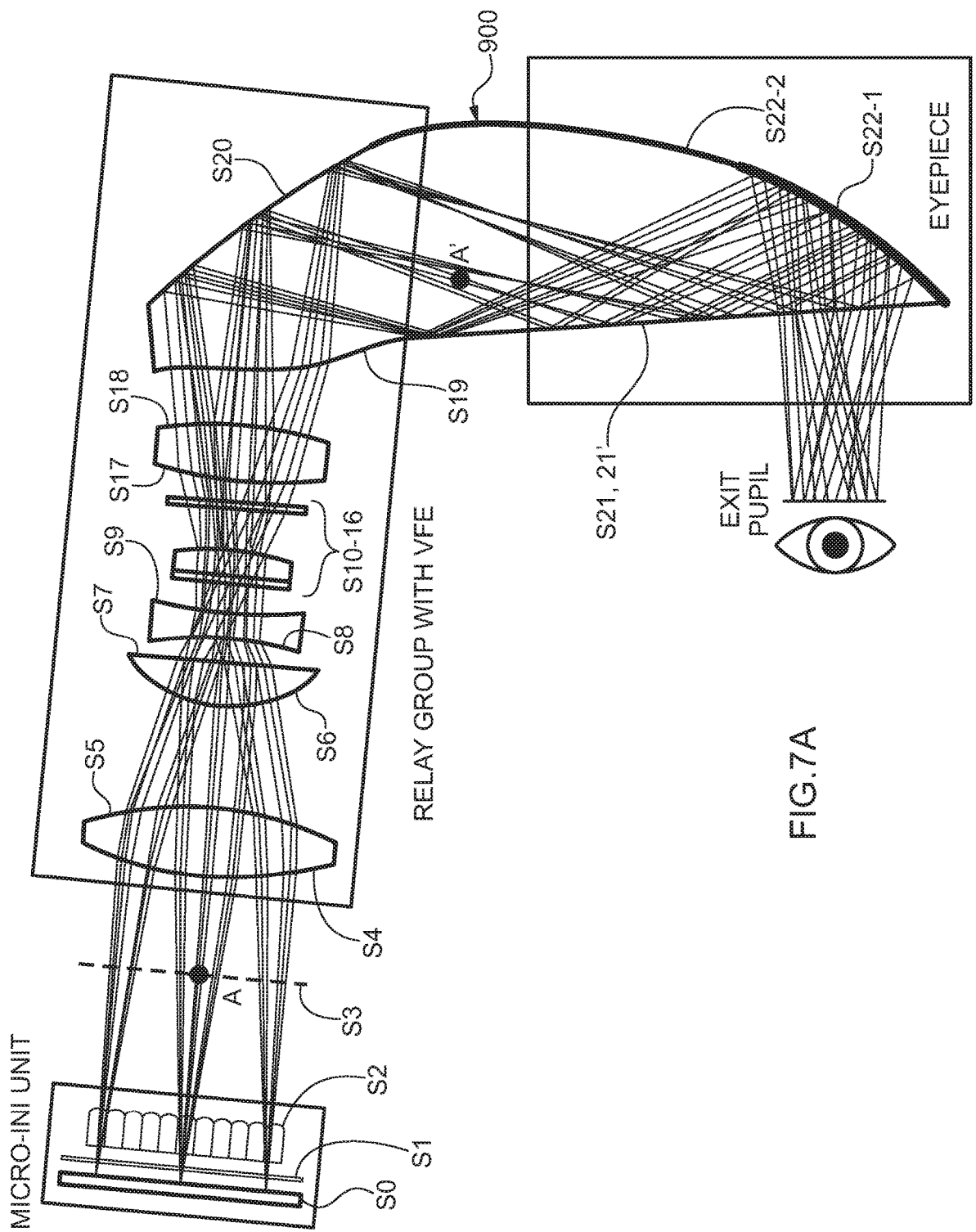
FIGS. 7A, 7B schematically illustrate an exemplary configuration of 2D optical layout of an InI-HMD design configuration in accordance with the present invention, with FIG. 7A showing the light field display path and FIG. 7B the see-through path.
Figure 7B:
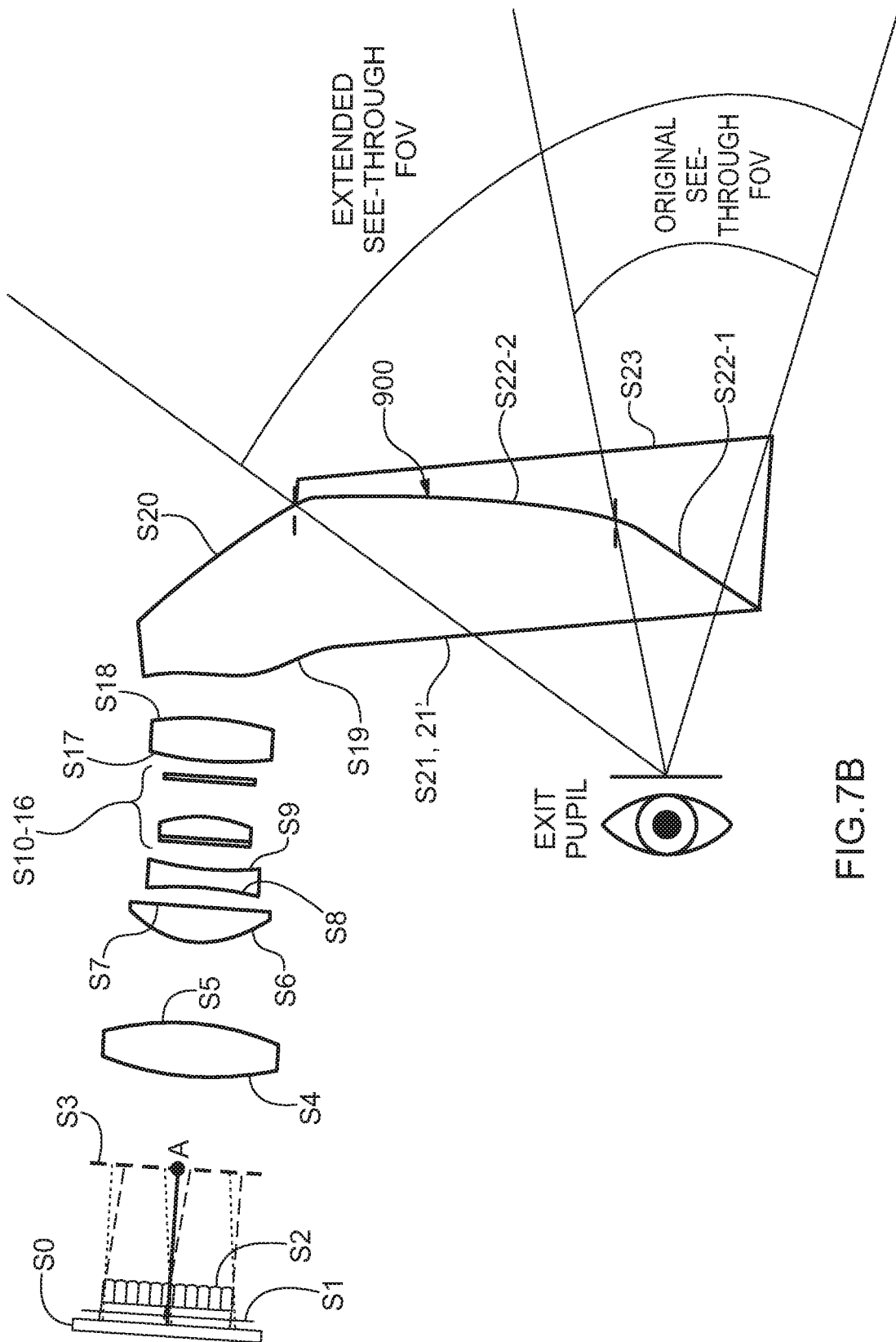

In accordance with yet another aspect of the present invention, FIG. 7A schematically illustrates an optical design of a physical system that embodies the conceptual system of FIG. 6A. FIG. 7A illustrates the 2D optical layout of the light field display path, and FIG. 7B shows the optical layout of the see-through path. The optical system of the light field display includes a micro-InI unit, a relay group with VFE, and a freeform waveguide. A part of the relay group may be incorporated into the waveguide. The Micro-InI unit may include a microdisplay S0, a pinhole array S1, and a microlens array S2. The relay group may include four lenses, a commercially available VFE (Electrical Lens EL 10-30 by Optotune Inc.), and two freeform surfaces (Surface S19 and S20). The freeform waveguide prism 900 may be formed by multiple freeform optical surfaces which are labeled as S19, S20, S21, and S22, respectively. In the design, part of a traditional relay group following the VFE may be incorporated into the prism 900 and fulfilled by the Surface S19 and S20. A light ray emitted from a 3D point (e.g. A) is first refracted by the surface S19 of the prism 900, followed by a reflection by the surface S20 to create an intermediate image (e.g. A'). The axial position of the intermediate image (e.g. A') is tunable by the VFE. Two more consecutive reflections by the surfaces S21' and S22-1 and a final refraction through the surface S21 allow the ray to reach the exit pupil of the system. There exist multiple bundles of rays from different elemental images but apparently from the same object point, each of which represents a different view of the object, impinging on different locations of the exit pupil. These ray bundles integrally reconstruct a virtual 3D point located in front of the eye. The rays reflected by the Surface S21' of the waveguide are required to satisfy the condition of total internal reflection. The rear surfaces S22-1, S22-2 of the prism 900 may be coated with a mirror coating for building an immersive HMD system which blocks the view of the real-world scene. Alternatively, the surface S22-1 may be coated with a beamsplitting coating if optical see-through capability is desired using the auxiliary lens, as shown in FIG. 7B.

It should be noted that in the design disclosed hereby the Z-axis is along the viewing direction, the Y-axis is parallel to the horizontal direction aligning with interpupilary direction, and the X-axis is in the vertical direction aligning with the head orientation. As a result, the overall waveguide system is symmetric about the horizontal (YOZ) plane, and the optical surfaces (S19, S20, S21, and S22) are decentered along the horizontal Y-axis and rotated about the vertical X-axis. The optical path is folded in the horizontal YOZ plane. This arrangement allows the micro-InI unit and the vari-focal relay group to be mounted on the temple side of the user's head, resulting in a balanced and ergonomic system packaging.

Table 1 highlighted some of the key performance specifications for the system of FIG. 7A. The system offers the ability to render the true 3D light field of a 3D scene which subtends a diagonal FOV of 35° and achieves an optical resolution as high as 2 arc minutes per pixel in the visual space. Furthermore, the system offers a large depth range, tunable from 0 to 5 diopters, with a high longitudinal resolution of about 0.1 diopters for a monocular display. Moreover, the system achieves a high view density of about 0.5/mm², where the view density, σ, is defined as the number of unique views per unit area on the exit pupil, given by:

$$\sigma = \frac{N}{A_{XP}}$$

where N is the total number of views and $A_{XP}$ is the area of the exit pupil of the display system. A view density of 0.5/mm² is equivalent to a viewing angle resolution of approximately 1 arc minute for objects at distance of 0.2 diopters. The exit pupil diameter for crosstalk-free viewing, also known as the eyebox of the display, is about 6 mm. In this embodiment, the exit pupil diameter is limited by the aperture size of the commercial VFE and it can be increased if another larger-aperture VFE is adopted. Finally, the system offers a large see-through FOV, greater than 65° horizontally and 40° vertically. The microdisplay utilized in our prototype is a 0.7" organic light emitting display (OLED) with an 8 μm color pixel and pixel resolution of 1920×1080 (ECX335A by Sony). The optics design itself, however, is able to support OLED panels of different dimensions or other type of microdisplays such as liquid crystal displays that have a color pixel size greater than 6 μm.

TABLE 1

First-order system specifications

| | |
|---|---|
| Tunable depth range of central depth plane (CDP) | 0~5 diopters |
| Field of view (Virtual Display) | 35° (diagonal), or 30.5° (Horizontal) × 17.5° (Vertical) at CDP |
| Field of view (See-through) | >75° (diagonal), or >65° (Horizontal) × 40° (Vertical) |
| Focal length of front relay group | 24 mm |
| Focal length of rear relay group | 24 mm |
| Focal range of the tunable lens | 75-100 mm (8.5 diopters) |
| Eyepiece focal length, $f_{eye}$ | 27.5 mm |
| Exit pupil diameter | 6 mm |
| Pitch of the lenslet in MLA | 1 mm |
| F-number of the MLA | 3.3 |

An exemplary implementation of the system of FIG. 7A is provided, Tables 2 through 5, in form of the optical surface data. Table 2 summarizes the basic parameters of the display path (units: mm). Tables 3 through 5 provide the optimized coefficients defining the non-spherical optical surfaces.

TABLE 2

Optical specifications of the InI-HMD display path

| Element number or name | Surface No. | Surface Type | Y Radius | Thickness | Material | Refract Mode |
|---|---|---|---|---|---|---|
| Aperture |  | Sphere | Infinity | 2.215 |  | Refract |
| MLA | S1 | Asphere | −5.32 | 3 | PMMA | Refract |
|  | S2 | Asphere | −1.48 | 13.833 |  | Refract |
|  | S3 | Sphere | Infinity | 10.547 |  | Refract |
| Front relay group | S4 | Sphere | 35.09 | 6.6 | NBK7_SCHOTT | Refract |
|  | S5 | Sphere | −35.09 | 9.970 |  | Refract |
|  | S6 | Sphere | 12.92 | 4.3 | NBK7_SCHOTT | Refract |
|  | S7 | Sphere | Infinity | 2.457 |  | Refract |
|  | S8 | Sphere | −39.78 | 2.5 | NSF11_SCHOTT | Refract |
|  | S9 | Sphere | 39.78 | 1.75 |  | Refract |
| VFE | S10 | Sphere | Infinity | 1.15 |  | Refract |
|  | S11 | Sphere | Infinity | 0.5 | BK7_SCHOTT | Refract |
|  | S12 | Sphere | Infinity | 2.758 | 'OL1024' | Refract |
|  | S13 | Sphere | −28.5714 | 4.492 |  | Refract |
|  | S14 | Sphere | Infinity | 0.5 | BK7_SCHOTT | Refract |
|  | S15 | Sphere | Infinity | 1.15 |  | Refract |
|  | S16 | Sphere | Infinity | 1 |  | Refract |
| Lens | S17 | Sphere | 40.67 | 5.3 | NBK7_SCHOTT | Refract |
|  | S18 | Sphere | −40.67 | 0 |  | Refract |
| Waveguide | S19 | XY Polynomial | 31.04167 | 0 | PMMA | Refract |
|  | S20 | XY Polynomial | −54.2094 | 0 | PMMA | Reflect |
|  | S21 | XY Polynomial | −145.276 | 0 | PMMA | Reflect |
|  | S22 | XY Polynomial | −47.3572 | 0 | PMMA | Reflect |
|  | S21' | XY Polynomial | −145.276 | 0 |  | Refract |

A high resolution microdisplay with pixels as small as 6 μm is adopted to achieve a high resolution virtual reconstructed 3D image. To achieve such high-resolution imaging for the micro-InI unit, a microlens array (MLA) formed by aspherical surfaces may specifically be designed. Each of the aspherical surfaces of the MLA may be described as, $$z = \frac{cr^2}{1+\sqrt{1-(1+k)c^2r^2}} + Ar^4 + Br^6 + Cr^8 + Dr^{10} + Er^{12}, \quad (14)$$

where z is the sag of the surface measured along the z-axis of a local x, y, z coordinate system, c is the vertex curvature, r is the radial distance, k is the conic constant, A through E are the 4th, 6th, 8th, 10th and 12th order deformation coefficients, respectively. The material of the MLA is PMMA. Table 3 provides the coefficients for the surfaces S1 and S2.

TABLE 3

Aspherical surface definitions for microlens array (MLA)

|  | S1 | S2 |
|---|---|---|
| Y Radius | −5.32 | −1.48 |
| Conic Constant (K) | 30 | −0.809 |
| 4th Order Coefficient (A) | −0.157 | −0.013 |
| 6th Order Coefficient (B) | −0.092 | 0.002 |

To enable enlarged see-through FOV, the freeform waveguide prism 900 may be formed by five freeform surfaces, labeled as surface S19, S20, S21/S21', S22-1, and S22-2, respectively. The freeform corrector lens may be formed by two freeform surfaces, in which the front surface shares the same surface specifications as the surfaces S22-1 and S22-2 of the waveguide prism 900 and the rear surface is denoted as surface S23. The surface segment of S22-1 is a reflective or partial reflective surface which receives the light fields generated by the micro-InI unit. A beamsplitting mirror coating on the segment of S22-1 also allows the transmission of the light rays from a real-world scene for see-through capability. The surface segment S22-2 is a transmissive or semi-transmissive surface which only receives the light rays from a real-world scene, while it does not receive the light fields generated by the micro-InI unit.

The freeform surfaces, including S19, S20, S21/S21', S22-1, and S23 may be described mathematically as $$z = \frac{cr^2}{1+\sqrt{1-(1+k)c^2r^2}} + \sum_{j=2}^{66} C_j x^m y^n j = \frac{(m+n)^2 + m + 3n}{2} + 1, \quad (15)$$

where z is the sag of the free-form surface measured along the z-axis of a local x, y, z coordinate system, c is the vertex curvature (CUY), r is the radial distance, k is the conic constant, and $C_j$ is the coefficient for $x^m y^n$. The material for both the waveguide prism and compensation lens is PMMA. Tables 4 through 8 provide the coefficients for the surfaces S19 through S21, S22-1, and S23, respectively, and Table 9 provides the surface references of each optical surface.

During the design process, the specifications for the Surface segment S22-1 were obtained after the optimization of the light field display path through the prism 900 composed of the micro-InI unit, the relay lens group, and the surfaces S19, S20, S21/21', and S22-1. The required aperture dimensions of Surfaces S20 and S22-1 were determined first for the light field display path. Then Surfaces S20, S21 and S22-1 were imported into 3D modeling software such as Solidworks® from which the Surface S22-2 was created. The shape of the Surface S22-2 was created in the modeling software by satisfying the following requirements: (1) it intersects with Surface S22-1 along or above the upper boundary line of the required aperture for surface S22-1 defined by the display path; (2) along the intersection line between the surface S22-2 and S22-2, the surface slopes at the intersection points on the surface S22-2 approximately match, if not equal, with those corresponding points on the surface S22-1 to ensure the two surfaces to appear to be nearly continuous, which minimizes visual artifacts to the see-through view when it is combined with a matching freeform corrector lens; (3) the Surface S22-2 intersects with the surface S20 along or below the lower boundary line of the required aperture for surface S20, defined by the display path; and (4) the overall thickness between the surface S21 and S22-2 is minimized. Finally, a freeform shape of the Surface S22-2 is obtained in the 3D modeling software which is combined with the surfaces S19, S20, S21/21', and S22-1 to create an enclosed freeform waveguide prism. FIG. 7B demonstrated a substantially enlarged see-through FOV through the method described above.

TABLE 4

Surface definition for freeform surface S19

| | |
|---|---|
| Y Radius | 31.0417 |
| Y Curvature | 3.2215e−2 |
| Conic Constant (SCO K \| C1) | −30 |
| X (SCO X \| C2) | 0 |
| Y (SCO Y \| C3) | 0 |
| X**2 (SCO X2 \| C4) | −0.0181749 |
| X * Y (SCO XY \| C5) | 0 |
| Y**2 (SCO Y2 \| C6) | −0.03201 |
| X**3 (SCO Y3 \| C7) | 0 |
| X**2 * Y (SCO X2Y \| C8) | −0.002337 |
| X Y**2 (SCO XY2 \| C9) | 0 |
| Y**3 (SCO Y3 \| C10) | −0.00340584 |
| X**4 (SCO X4 \| C11) | 2.214179429e−005 |
| X**3 * Y (SCO X3Y \| C12) | 0 |
| X**2 * Y**2 (SCO X2Y2 \| C13) | −8.34173481e−005 |
| X * Y**3 (SCO XY3 \| C14) | 0 |
| Y**4 (SCO Y4 \| C15) | −0.00012019 |
| X**5 (SCO X5 \| C16) | 0 |
| X**4 * Y (SCO X4Y \| C17) | −1.9551358e−006 |
| X**3 * Y**2 (SCO X3Y2 \| C18) | 0 |
| X**2 * Y**3 (SCO X2Y3 \| C19) | −5.7523828e−007 |
| X * Y**4 (SCO XY4 \| C20) | 0 |
| Y**5 (SCO Y5 \| C21) | −2.18978576e−006 |
| X**6 (SCO X6 \| C22) | −1.08276112e−007 |
| X**5 * Y (SCO X5Y \| C23) | 0 |
| X**4 * Y**2 (SCO X4Y2 \| C24) | −3.584137e−007 |
| X**3 * Y**3 (SCO X3Y3 \| C25) | 0 |
| X**2 * Y**4 (SCO X2Y4 \| C26) | 9.1214167e−008 |
| X * Y**5 (SCO XY5 \| C27) | 0 |
| Y**6 (SCO Y6 \| C28) | −5.28011679e−009 |
| X**7 (SCO X7 \| C29) | 0 |
| X**6 * Y (SCO X6Y \| C30) | 0 |
| X**5 * Y**2 (SCO X5Y2 \| C31) | 0 |
| X**4 * Y**3 (SCO X4Y3 \| C32) | 0 |
| X**3 * Y**4 (SCO X3Y4 \| C33) | 0 |
| X**2 * Y**5 (SCO S2Y5 \| C34) | 0 |
| X * Y**6 (SCO XY6 \| C35) | 0 |
| Y**7 (SCO Y7 \| C36) | 0 |
| X**8 (SCO X8 \| C37) | 0 |
| X**7 * Y (SCO X7Y \| C38) | 0 |
| X**6 * Y**2 (SCO X6Y2 \| C39) | 0 |
| X**5 * Y**3 (SCO X5Y3 \| C40) | 0 |
| X**4 * Y**4 (SCO X4Y4 \| C41) | 0 |
| X**3 * Y**5 (SCO X3Y5 \| C42) | 0 |
| X**2 * Y**6 (SCO X2Y6 \| C43) | 0 |
| X * Y**7 (SCO XY7 \| C44) | 0 |
| Y**8 (SCO Y8 \| C45) | 0 |
| X**9 (SCO X9 \| C46) | 0 |
| X**8 * Y (SCO X8Y \| C47) | 0 |
| X**7 * Y**2 (SCO X7Y2 \| C48) | 0 |
| X**6 * Y**3 (SCO X6Y3 \| C49) | 0 |
| X**5 * Y**4 (SCO X5Y4 \| C50) | 0 |
| X**4 * Y**5 (SCO X4Y5 \| C51) | 0 |
| X**3 * Y**6 (SCO X3Y6 \| C52) | 0 |
| X**2 * Y**7 (SCO X2Y7 \| C53) | 0 |
| X * Y**8 (SCO XY8 \| C54) | 0 |
| Y**9 (SCO Y9 \| C55) | 0 |
| X**10 (SCO X10 \| C56) | 0 |
| X**9 * Y (SCO X9Y \| C57) | 0 |
| X**8 * Y**2 (SCO X8Y2 \| C58) | 0 |
| X**7 * Y**3 (SCO X7Y3 \| C59) | 0 |
| X**6 * Y**4 (SCO X6Y4 \| C60) | 0 |
| X**5 * Y**5 (SCO X5Y5 \| C61) | 0 |
| X**4 * Y**6 (SCO X4Y6 \| C62) | 0 |
| X**3 * Y**7 (SCO X3Y7 \| C63) | 0 |
| X**2 * Y**8 (SCO X2Y8 \| C64) | 0 |
| X * Y**9 (SCO XY9 \| C65) | 0 |
| Y**10 (SCO Y10 \| C66) | 0 |

TABLE 5

Surface definition for freeform surface S20

| | |
|---|---|
| Y Radius | −54.2094 |
| Y Curvature | −1.845e−2 |
| Conic Constant (SCO K \| C1) | −13.0997 |
| X (SCO X \| C2) | 0 |
| Y (SCO Y \| C3) | 0 |
| X**2 (SCO X2 \| C4) | 0.0011699 |
| X * Y (SCO XY \| C5) | 0 |
| Y**2 (SCO Y2 \| C6) | 0.00676927 |
| X**3 (SCO Y3 \| C7) | 0 |
| X**2 * Y (SCO X2Y \| C8) | −4.52710486e−005 |
| X Y**2 (SCO XY2 \| C9) | 0 |
| Y**3 (SCO Y3 \| C10) | −0.00011081 |
| X**4 (SCO X4 \| C11) | −1.1510996e−005 |
| X**3 * Y (SCO X3Y \| C12) | 0 |
| X**2 * Y**2 (SCO X2Y2 \| C13) | −9.13752747e−006 |
| X * Y**3 (SCO XY3 \| C14) | 0 |
| Y**4 (SCO Y4 \| C15) | −5.5289301e−006 |
| X**5 (SCO X5 \| C16) | 0 |
| X**4 * Y (SCO X4Y \| C17) | −8.8179807e−007 |
| X**3 * Y**2 (SCO X3Y2 \| C18) | 0 |
| X**2 * Y**3 (SCO X2Y3 \| C19) | −1.06187669e−006 |
| X * Y**4 (SCO XY4 \| C20) | 0 |
| Y**5 (SCO Y5 \| C21) | −3.38263553e−007 |
| X**6 (SCO X6 \| C22) | 4.77710263e−008 |
| X**5 * Y (SCO X5Y \| C23) | 0 |
| X**4 * Y**2 (SCO X4Y2 \| C24) | 6.21915481e−008 |
| X**3 * Y**3 (SCO X3Y3 \| C25) | 0 |
| X**2 * Y**4 (SCO X2Y4 \| C26) | 1.43552488e−007 |
| X * Y**5 (SCO XY5 \| C27) | 0 |
| Y**6 (SCO Y6 \| C28) | 5.362211474e−008 |
| X**7 (SCO X7 \| C29) | 0 |
| X**6 * Y (SCO X6Y \| C30) | 1.193262499e−008 |
| X**5 * Y**2 (SCO X5Y2 \| C31) | 0 |
| X**4 * Y**3 (SCO X4Y3 \| C32) | −6.01716948e−009 |
| X**3 * Y**4 (SCO X3Y4 \| C33) | 0 |
| X**2 * Y**5 (SCO S2Y5 \| C34) | −8.19603928e−009 |
| X * Y**6 (SCO XY6 \| C35) | 0 |
| Y**7 (SCO Y7 \| C36) | −2.505270966e−009 |
| X**8 (SCO X8 \| C37) | −8.149026e−010 |
| X**7 * Y (SCO X7Y \| C38) | 0 |
| X**6 * Y**2 (SCO X6Y2 \| C39) | −1.84757517e−010 |
| X**5 * Y**3 (SCO X5Y3 \| C40) | 0 |
| X**4 * Y**4 (SCO X4Y4 \| C41) | 2.388128888e−010 |
| X**3 * Y**5 (SCO X3Y5 \| C42) | 0 |
| X**2 * Y**6 (SCO X2Y6 \| C43) | 1.61835037e−010 |
| X * Y**7 (SCO XY7 \| C44) | 0 |
| Y**8 (SCO Y8 \| C45) | 3.966177607e−011 |
| X**9 (SCO X9 \| C46) | 0 |
| X**8 * Y (SCO X8Y \| C47) | 0 |
| X**7 * Y**2 (SCO X7Y2 \| C48) | 0 |
| X**6 * Y**3 (SCO X6Y3 \| C49) | 0 |
| X**5 * Y**4 (SCO X5Y4 \| C50) | 0 |
| X**4 * Y**5 (SCO X4Y5 \| C51) | 0 |
| X**3 * Y**6 (SCO X3Y6 \| C52) | 0 |

TABLE 5-continued

Surface definition for freeform surface S20

| | |
|---|---|
| X**2 * Y**7 (SCO X2Y7 | C53) | 0 |
| X * Y**8 (SCO XY8 | C54) | 0 |
| Y**9 (SCO Y9 | C55) | 0 |
| X**10 (SCO X10 | C56) | 0 |
| X**9 * Y (SCO X9Y | C57) | 0 |
| X**8 * Y**2 (SCO X8Y2 | C58) | 0 |
| X**7 * Y**3 (SCO X7Y3 | C59) | 0 |
| X**6 * Y**4 (SCO X6Y4 | C60) | 0 |
| X**5 * Y**5 (SCO X5Y5 | C61) | 0 |
| X**4 * Y**6 (SCO X4Y6 | C62) | 0 |
| X**3 * Y**7 (SCO X3Y7 | C63) | 0 |
| X**2 * Y**8 (SCO X2Y8 | C64) | 0 |
| X * Y**9 (SCO XY9 | C65) | 0 |
| Y**10 (SCO Y10 | C66) | 0 |

TABLE 6

Surface definition for freeform surface S21/S21'

| | |
|---|---|
| Y Radius | −145.276 |
| Y Curvature | −6.88e-3 |
| Conic Constant (SCO K | C1) | −1.5654 |
| X (SCO X | C2) | 0 |
| Y (SCO Y | C3) | 0 |
| X**2 (SCO X2 | C4) | −0.0142277 |
| X * Y (SCO XY | C5) | 0 |
| Y**2 (SCO Y2 | C6) | 0.00392684 |
| X**3 (SCO Y3 | C7) | 0 |
| X**2 * Y (SCO X2Y | C8) | 0.000646111 |
| X Y**2 (SCO XY2 | C9) | 0 |
| Y**3 (SCO Y3 | C10) | 2.44041e-005 |
| X**4 (SCO X4 | C11) | 0.000151 |
| X**3 * Y (SCO X3Y | C12) | 0 |
| X**2 * Y**2 (SCO X2Y2 | C13) | −8.2192e-006 |
| X * Y**3 (SCO XY3 | C14) | 0 |
| Y**4 (SCO Y4 | C15) | −3.028061e-007 |
| X**5 (SCO X5 | C16) | 0 |
| X**4 * Y (SCO X4Y | C17) | −4.13244e-006 |
| X**3 * Y**2 (SCO X3Y2 | C18) | 0 |
| X**2 * Y**3 (SCO X2Y3 | C19) | 2.964542e-008 |
| X * Y**4 (SCO XY4 | C20) | 0 |
| Y**5 (SCO Y5 | C21) | 1.127521e-009 |
| X**6 (SCO X6 | C22) | 4.4371187e-008 |
| X**5 * Y (SCO X5Y | C23) | 0 |
| X**4 * Y**2 (SCO X4Y2 | C24) | 2.7776459e-008 |
| X**3 * Y**3 (SCO X3Y3 | C25) | 0 |
| X**2 * Y**4 (SCO X2Y4 | C26) | −3.277381e-011 |
| X * Y**5 (SCO XY5 | C27) | 0 |
| Y**6 (SCO Y6 | C28) | −1.4480674e-012 |
| X**7 (SCO X7 | C29) | 0 |
| X**6 * Y (SCO X6Y | C30) | 0 |
| X**5 * Y**2 (SCO X5Y2 | C31) | 0 |
| X**4 * Y**3 (SCO X4Y3 | C32) | 0 |
| X**3 * Y**4 (SCO X3Y4 | C33) | 0 |
| X**2 * Y**5 (SCO S2Y5 | C34) | 0 |
| X * Y**6 (SCO XY6 | C35) | 0 |
| Y**7 (SCO Y7 | C36) | 0 |
| X**8 (SCO X8 | C37) | 0 |
| X**7 * Y (SCO X7Y | C38) | 0 |
| X**6 * Y**2 (SCO X6Y2 | C39) | 0 |
| X**5 * Y**3 (SCO X5Y3 | C40) | 0 |
| X**4 * Y**4 (SCO X4Y4 | C41) | 0 |
| X**3 * Y**5 (SCO X3Y5 | C42) | 0 |
| X**2 * Y**6 (SCO X2Y6 | C43) | 0 |
| X * Y**7 (SCO XY7 | C44) | 0 |
| Y**8 (SCO Y8 | C45) | 0 |
| X**9 (SCO X9 | C46) | 0 |
| X**8 * Y (SCO X8Y | C47) | 0 |
| X**7 * Y**2 (SCO X7Y2 | C48) | 0 |
| X**6 * Y**3 (SCO X6Y3 | C49) | 0 |
| X**5 * Y**4 (SCO X5Y4 | C50) | 0 |
| X**4 * Y**5 (SCO X4Y5 | C51) | 0 |
| X**3 * Y**6 (SCO X3Y6 | C52) | 0 |
| X**2 * Y**7 (SCO X2Y7 | C53) | 0 |
| X * Y**8 (SCO XY8 | C54) | 0 |

TABLE 6-continued

Surface definition for freeform surface S21/S21'

| | |
|---|---|
| Y**9 (SCO Y9 | C55) | 0 |
| X**10 (SCO X10 | C56) | 0 |
| X**9 * Y (SCO X9Y | C57) | 0 |
| X**8 * Y**2 (SCO X8Y2 | C58) | 0 |
| X**7 * Y**3 (SCO X7Y3 | C59) | 0 |
| X**6 * Y**4 (SCO X6Y4 | C60) | 0 |
| X**5 * Y**5 (SCO X5Y5 | C61) | 0 |
| X**4 * Y**6 (SCO X4Y6 | C62) | 0 |
| X**3 * Y**7 (SCO X3Y7 | C63) | 0 |
| X**2 * Y**8 (SCO X2Y8 | C64) | 0 |
| X * Y**9 (SCO XY9 | C65) | 0 |
| Y**10 (SCO Y10 | C66) | 0 |

TABLE 7

Surface definition for freeform surface S22-1

| | |
|---|---|
| Y Radius | −47.3572012741099 |
| Y Curvature | −2.111611e-2 |
| Conic Constant (SCO K | C1) | −4.32135 |
| X (SCO X | C2) | 0 |
| Y (SCO Y | C3) | 0 |
| X**2 (SCO X2 | C4) | 0.000908 |
| X * Y (SCO XY | C5) | 0 |
| Y**2 (SCO Y2 | C6) | 0.005975 |
| X**3 (SCO Y3 | C7) | 0 |
| X**2 * Y (SCO X2Y | C8) | 4.66442802e-005 |
| X Y**2 (SCO XY2 | C9) | 0 |
| Y**3 (SCO Y3 | C10) | 0.000101981 |
| X**4 (SCO X4 | C11) | −5.17499005e-006 |
| X**3 * Y (SCO X3Y | C12) | 0 |
| X**2 * Y**2 (SCO X2Y2 | C13) | −4.7451096e-006 |
| X * Y**3 (SCO XY3 | C14) | 0 |
| Y**4 (SCO Y4 | C15) | −2.4419368e-007 |
| X**5 (SCO X5 | C16) | 0 |
| X**4 * Y (SCO X4Y | C17) | −1.9769907e-007 |
| X**3 * Y**2 (SCO X3Y2 | C18) | 0 |
| X**2 * Y**3 (SCO X2Y3 | C19) | 3.352610999e-008 |
| X * Y**4 (SCO XY4 | C20) | 0 |
| Y**5 (SCO Y5 | C21) | 1.61592149e-008 |
| X**6 (SCO X6 | C22) | 8.08067957e-009 |
| X**5 * Y (SCO X5Y | C23) | 0 |
| X**4 * Y**2 (SCO X4Y2 | C24) | 7.3374791e-009 |
| X**3 * Y**3 (SCO X3Y3 | C25) | 0 |
| X**2 * Y**4 (SCO X2Y4 | C26) | 6.611479e-009 |
| X * Y**5 (SCO XY5 | C27) | 0 |
| Y**6 (SCO Y6 | C28) | 9.4341645e-011 |
| X**7 (SCO X7 | C29) | 0 |
| X**6 * Y (SCO X6Y | C30) | 7.9369652e-010 |
| X**5 * Y**2 (SCO X5Y2 | C31) | 0 |
| X**4 * Y**3 (SCO X4Y3 | C32) | 6.27173598e-010 |
| X**3 * Y**4 (SCO X3Y4 | C33) | 0 |
| X**2 * Y**5 (SCO S2Y5 | C34) | 1.332732e-010 |
| X * Y**6 (SCO XY6 | C35) | 0 |
| Y**7 (SCO Y7 | C36) | −1.5647943e-011 |
| X**8 (SCO X8 | C37) | −2.12470728e-012 |
| X**7 * Y (SCO X7Y | C38) | 0 |
| X**6 * Y**2 (SCO X6Y2 | C39) | 3.27745944e-011 |
| X**5 * Y**3 (SCO X5Y3 | C40) | 0 |
| X**4 * Y**4 (SCO X4Y4 | C41) | 1.07463864e-011 |
| X**3 * Y**5 (SCO X3Y5 | C42) | 0 |
| X**2 * Y**6 (SCO X2Y6 | C43) | 1.347790032e-012 |
| X * Y**7 (SCO XY7 | C44) | 0 |
| Y**8 (SCO Y8 | C45) | −9.599201503e-014 |
| X**9 (SCO X9 | C46) | 0 |
| X**8 * Y (SCO X8Y | C47) | 0 |
| X**7 * Y**2 (SCO X7Y2 | C48) | 0 |
| X**6 * Y**3 (SCO X6Y3 | C49) | 0 |
| X**5 * Y**4 (SCO X5Y4 | C50) | 0 |
| X**4 * Y**5 (SCO X4Y5 | C51) | 0 |
| X**3 * Y**6 (SCO X3Y6 | C52) | 0 |
| X**2 * Y**7 (SCO X2Y7 | C53) | 0 |
| X * Y**8 (SCO XY8 | C54) | 0 |
| Y**9 (SCO Y9 | C55) | 0 |
| X**10 (SCO X10 | C56) | 0 |

TABLE 7-continued

Surface definition for freeform surface S22-1

| | |
|---|---|
| X**9 * Y (SCO X9Y \| C57) | 0 |
| X**8 * Y**2 (SCO X8Y2 \| C58) | 0 |
| X**7 * Y**3 (SCO X7Y3 \| C59) | 0 |
| X**6 * Y**4 (SCO X6Y4 \| C60) | 0 |
| X**5 * Y**5 (SCO X5Y5 \| C61) | 0 |
| X**4 * Y**6 (SCO X4Y6 \| C62) | 0 |
| X**3 * Y**7 (SCO X3Y7 \| C63) | 0 |
| X**2 * Y**8 (SCO X2Y8 \| C64) | 0 |
| X * Y**9 (SCO XY9 \| C65) | 0 |
| Y**10 (SCO Y10 \| C66) | 0 |

TABLE 8

Surface definition for freeform surface S23

| | |
|---|---|
| Y Radius | 149.3605 |
| Y Curvature | 6.695e−3 |
| Conic Constant (SCO K \| C1) | 9.81433 |
| X (SCO X \| C2) | 0 |
| Y (SCO Y \| C3) | 0 |
| X**2 (SCO X2 \| C4) | −0.024663 |
| X * Y (SCO XY \| C5) | 0 |
| Y**2 (SCO Y2 \| C6) | 0.0612683 |
| X**3 (SCO Y3 \| C7) | 0 |
| X**2 * Y (SCO X2Y \| C8) | 0.0010723 |
| X Y**2 (SCO XY2 \| C9) | 0 |
| Y**3 (SCO Y3 \| C10) | 2.4386556e−005 |
| X**4 (SCO X4 \| C11) | 0.00013098 |
| X**3 * Y (SCO X3Y \| C12) | 0 |
| X**2 * Y**2 (SCO X2Y2 \| C13) | −1.2892527e−006 |
| X * Y**3 (SCO XY3 \| C14) | 0 |
| Y**4 (SCO Y4 \| C15) | 2.62995523e−006 |
| X**5 (SCO X5 \| C16) | 0 |
| X**4 * Y (SCO X4Y \| C17) | −6.0819504e−006 |
| X**3 * Y**2 (SCO X3Y2 \| C18) | 0 |
| X**2 * Y**3 (SCO X2Y3 \| C19) | −1.3155971e−007 |
| X * Y**4 (SCO XY4 \| C20) | 0 |
| Y**5 (SCO Y5 \| C21) | 4.0503658e−008 |
| X**6 (SCO X6 \| C22) | 1.3439432e−007 |
| X**5 * Y (SCO X5Y \| C23) | 0 |
| X**4 * Y**2 (SCO X4Y2 \| C24) | 2.5855823e−008 |
| X**3 * Y**3 (SCO X3Y3 \| C25) | 0 |
| X**2 * Y**4 (SCO X2Y4 \| C26) | −2.699141e−008 |
| X * Y**5 (SCO XY5 \| C27) | 0 |
| Y**6 (SCO Y6 \| C28) | 5.31499927e−009 |
| X**7 (SCO X7 \| C29) | 0 |
| X**6 * Y (SCO X6Y \| C30) | −3.738121e−009 |
| X**5 * Y**2 (SCO X5Y2 \| C31) | 0 |
| X**4 * Y**3 (SCO X4Y3 \| C32) | 2.69691705e−012 |
| X**3 * Y**4 (SCO X3Y4 \| C33) | 0 |
| X**2 * Y**5 (SCO S2Y5 \| C34) | 4.84174393e−011 |
| X * Y**6 (SCO XY6 \| C35) | 0 |
| Y**7 (SCO Y7 \| C36) | −1.39752199e−010 |
| X**8 (SCO X8 \| C37) | 4.2757097e−011 |
| X**7 * Y (SCO X7Y \| C38) | 0 |
| X**6 * Y**2 (SCO X6Y2 \| C39) | 1.1630807e−011 |
| X**5 * Y**3 (SCO X5Y3 \| C40) | 0 |
| X**4 * Y**4 (SCO X4Y4 \| C41) | 3.4775484e−011 |
| X**3 * Y**5 (SCO X3Y5 \| C42) | 0 |
| X**2 * Y**6 (SCO X2Y6 \| C43) | 3.6136367e−012 |
| X * Y**7 (SCO XY7 \| C44) | 0 |
| Y**8 (SCO Y8 \| C45) | −5.8509308e−013 |
| X**9 (SCO X9 \| C46) | 0 |
| X**8 * Y (SCO X8Y \| C47) | 0 |
| X**7 * Y**2 (SCO X7Y2 \| C48) | 0 |
| X**6 * Y**3 (SCO X6Y3 \| C49) | 0 |
| X**5 * Y**4 (SCO X5Y4 \| C50) | 0 |
| X**4 * Y**5 (SCO X4Y5 \| C51) | 0 |
| X**3 * Y**6 (SCO X3Y6 \| C52) | 0 |
| X**2 * Y**7 (SCO X2Y7 \| C53) | 0 |
| X * Y**8 (SCO XY8 \| C54) | 0 |
| Y**9 (SCO Y9 \| C55) | 0 |
| X**10 (SCO X10 \| C56) | 0 |
| X**9 * Y (SCO X9Y \| C57) | 0 |
| X**8 * Y**2 (SCO X8Y2 \| C58) | 0 |

TABLE 8-continued

Surface definition for freeform surface S23

| | |
|---|---|
| X**7 * Y**3 (SCO X7Y3 \| C59) | 0 |
| X**6 * Y**4 (SCO X6Y4 \| C60) | 0 |
| X**5 * Y**5 (SCO X5Y5 \| C61) | 0 |
| X**4 * Y**6 (SCO X4Y6 \| C62) | 0 |
| X**3 * Y**7 (SCO X3Y7 \| C63) | 0 |
| X**2 * Y**8 (SCO X2Y8 \| C64) | 0 |
| X * Y**9 (SCO XY9 \| C65) | 0 |
| Y**10 (SCO Y10 \| C66) | 0 |

TABLE 9

Definition of the local surface references in the global coordinate system

| | Origin of surface reference | | | Orientation of the surface |
|---|---|---|---|---|
| | X (mm) | Y (mm) | Z (mm) | Rotation about X-axis θ (°) |
| Surface S19 | 0 | 4.912722 | 5.374900 | 2.588056 |
| Surface S20 | 0 | −5.688113 | 25.091300 | 36.309581 |
| Surface S21 | 0 | −128.220891 | 77.884058 | 18.362678 |
| Surface S22-1 | 0 | −35.523862 | 76.539845 | −13.778904 |
| Surface S23 | 0 | −82.2906 | 81.8565 | 82.6660 |

Figure 8A:
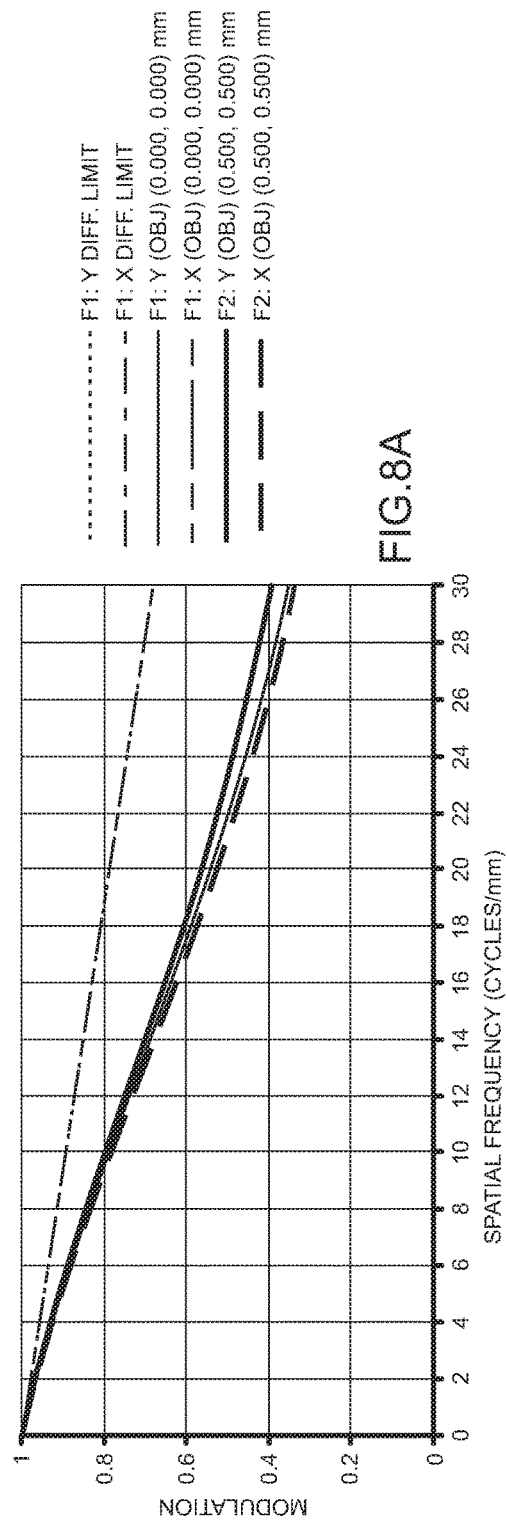
FIGS. 8A, 8B illustrate MTF (modulation transfer function) plots for the reconstruction central depth plane (CDP) depth of 3 diopters for fields on-axis (FIG. 8A) and for fields for the furthest MLA (micro lens array) element near the edge of the MLA (FIG. 8B)
Figure 8B:
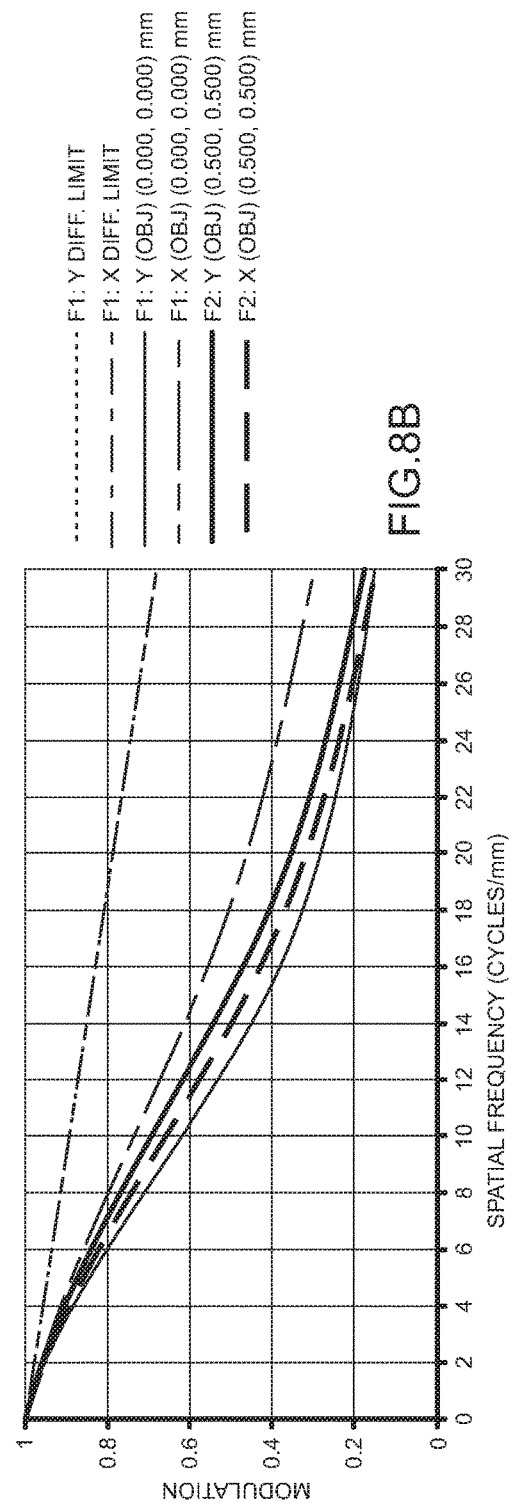
Figure 9A:
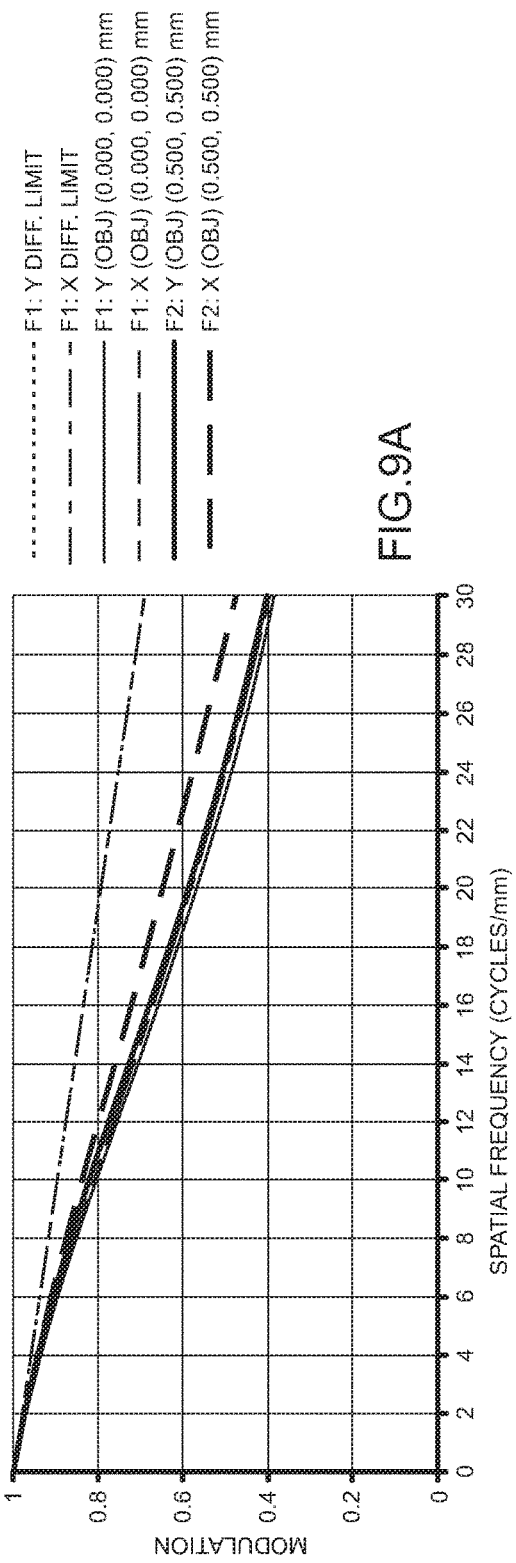
FIGS. 9A, 9B illustrate MTF plots for the reconstruction CDP depth of 2 diopters for fields on-axis to the MLA (FIG. 9A) and fields for the furthest MLA element near the edge of the MLA (FIG. 9B)
Figure 9B:
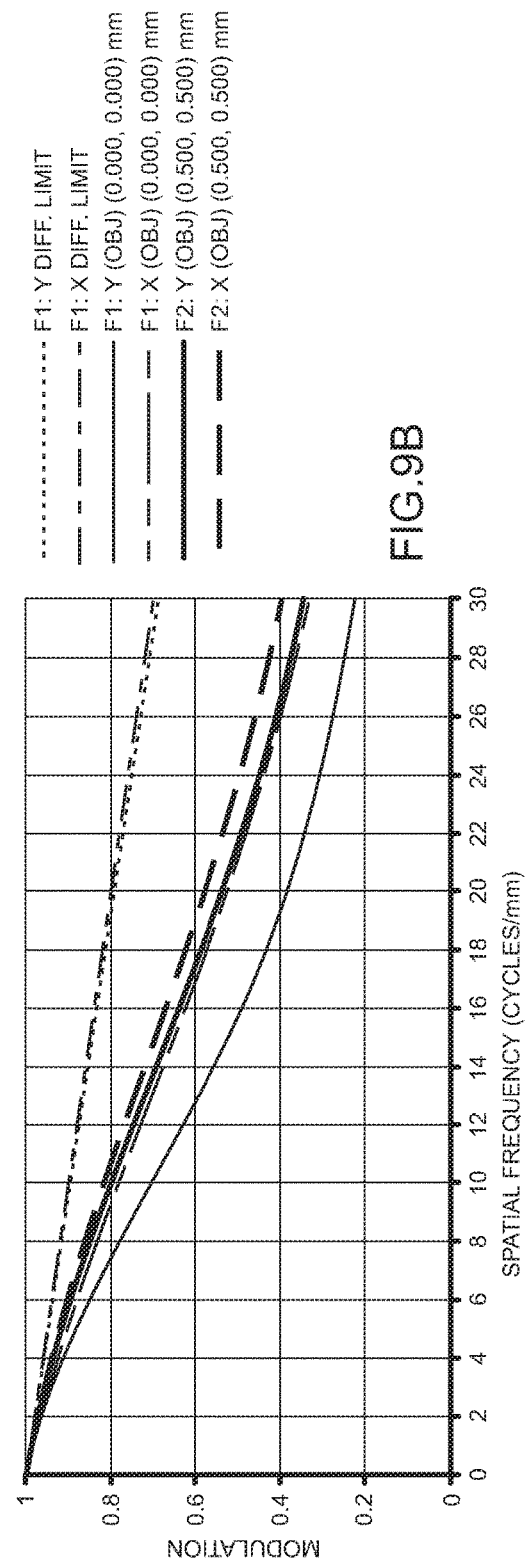
Figure 10A:
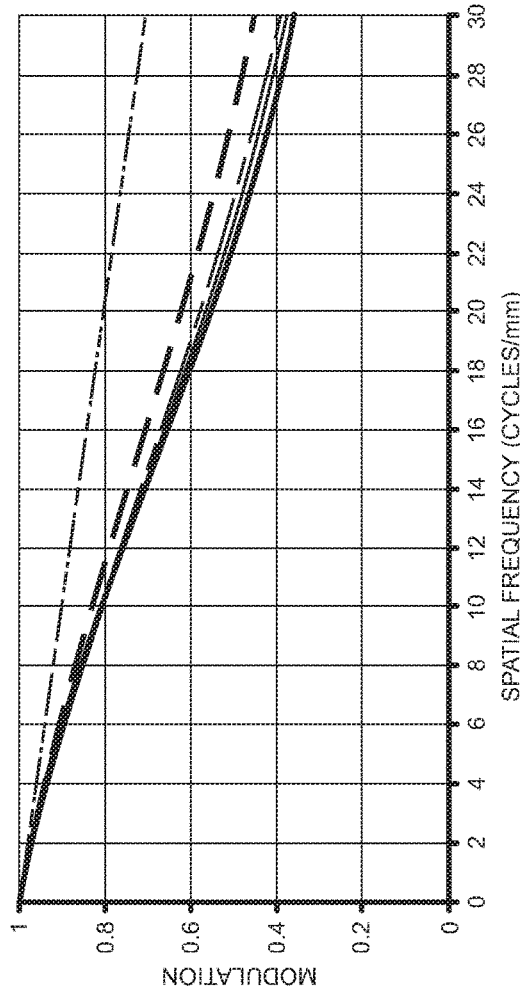
FIGS. 10A, 10B illustrate MTF plots for the reconstruction CDP depth of 0 diopters for fields on-axis to the MLA (FIG. 10A) and for fields for the furthest MLA element near the edge of the MLA (FIG. 10B)
Figure 10B:
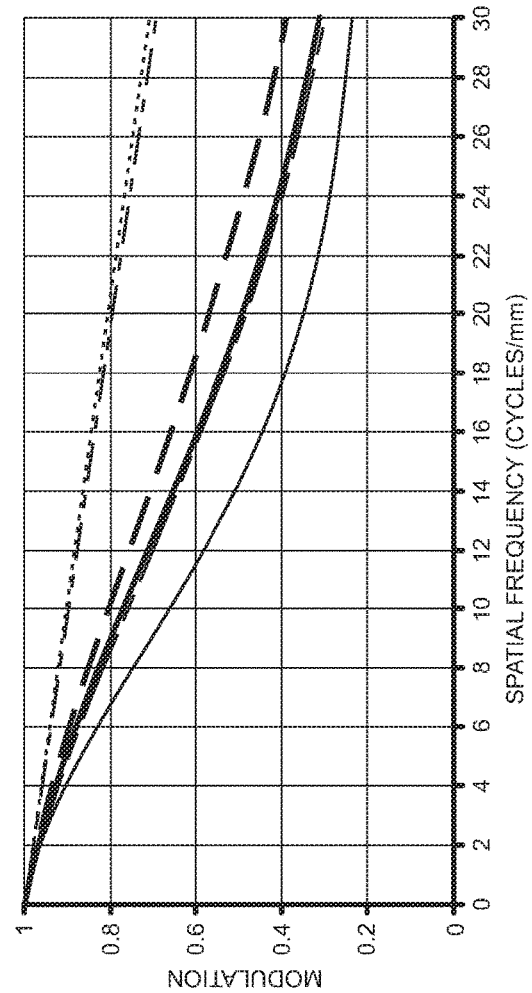
Figure 11A:
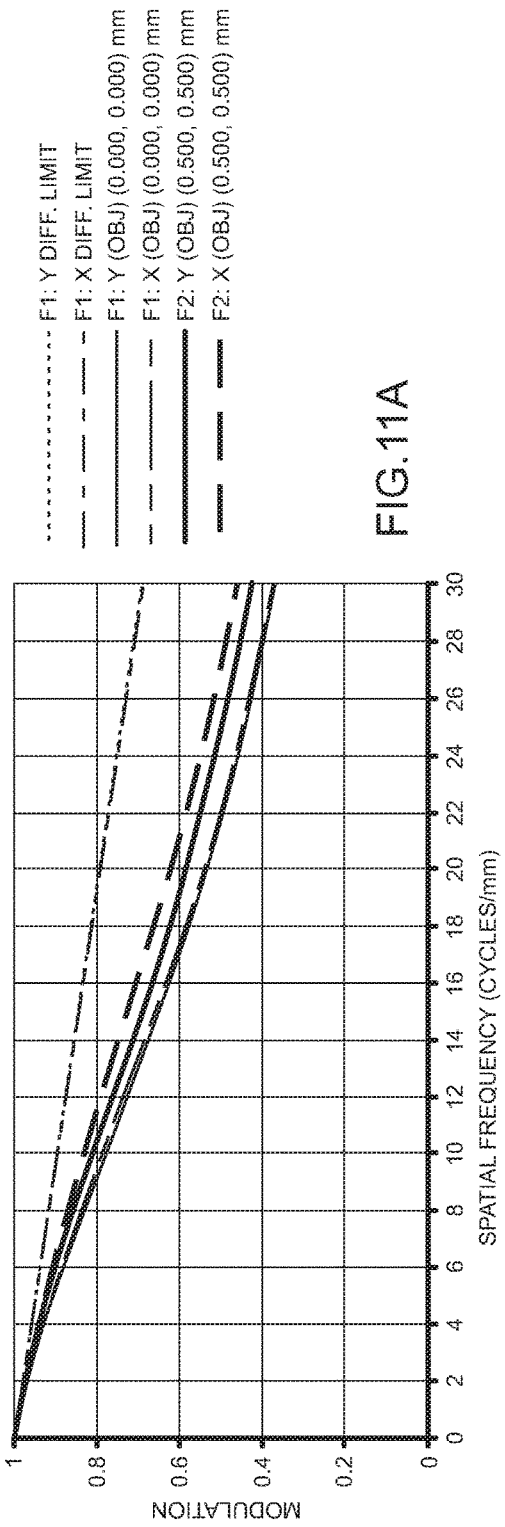
FIGS. 11A, 11B illustrate MTF plots for the reconstruction points shifted away from CDP by 0.25 diopters for fields on-axis to the MLA (FIG. 11A) and for fields for the furthest MLA element near the edge of the MLA (FIG. 11B)
Figure 11B:
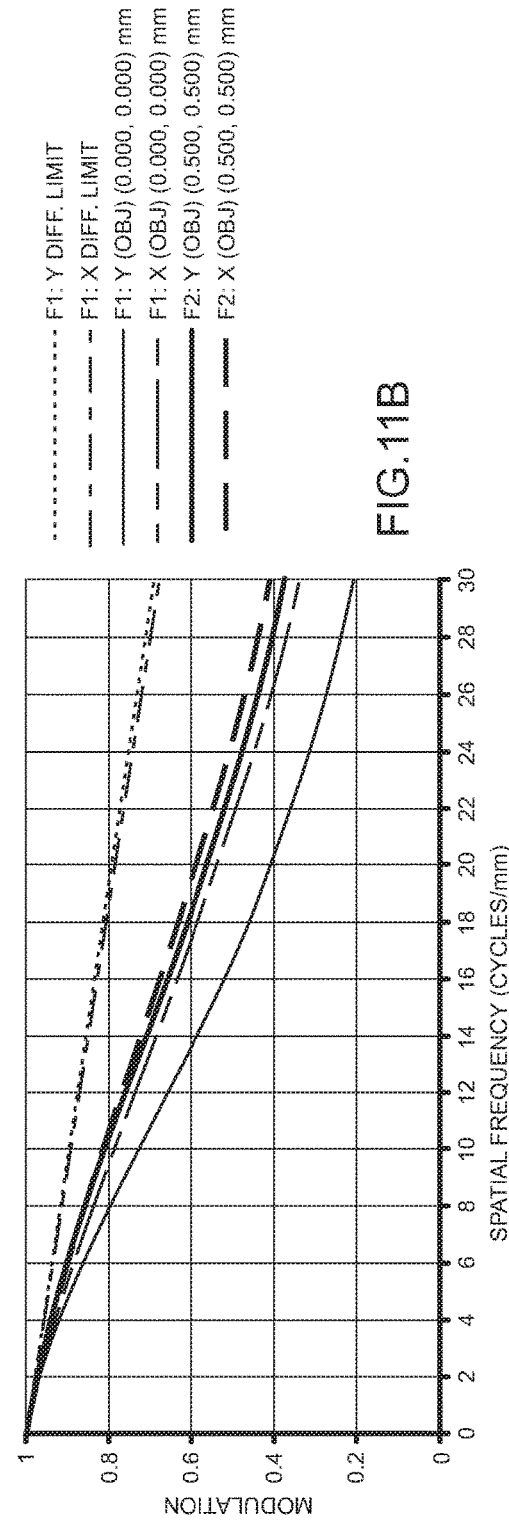
Figure 12A:
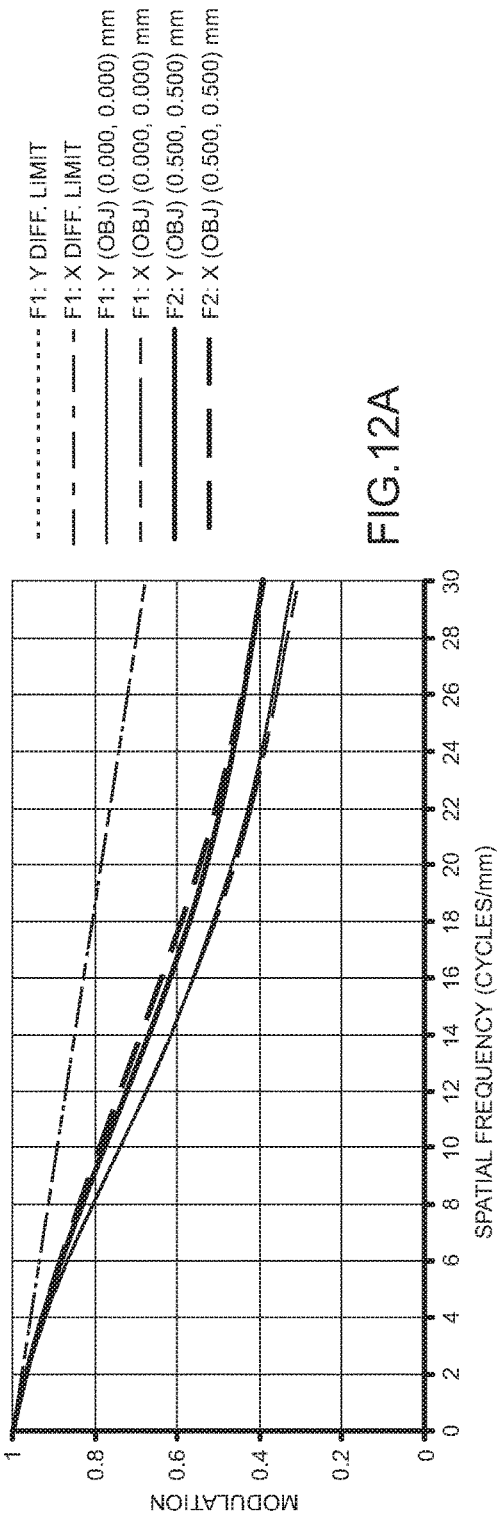
FIGS. 12A, 12B illustrate MTF plots for the reconstruction points shifted away from CDP by 0.5 diopters for fields on-axis to the MLA (FIG. 12A) and for fields for the furthest MLA element near the edge of the MLA (FIG. 12B)
Figure 12B:
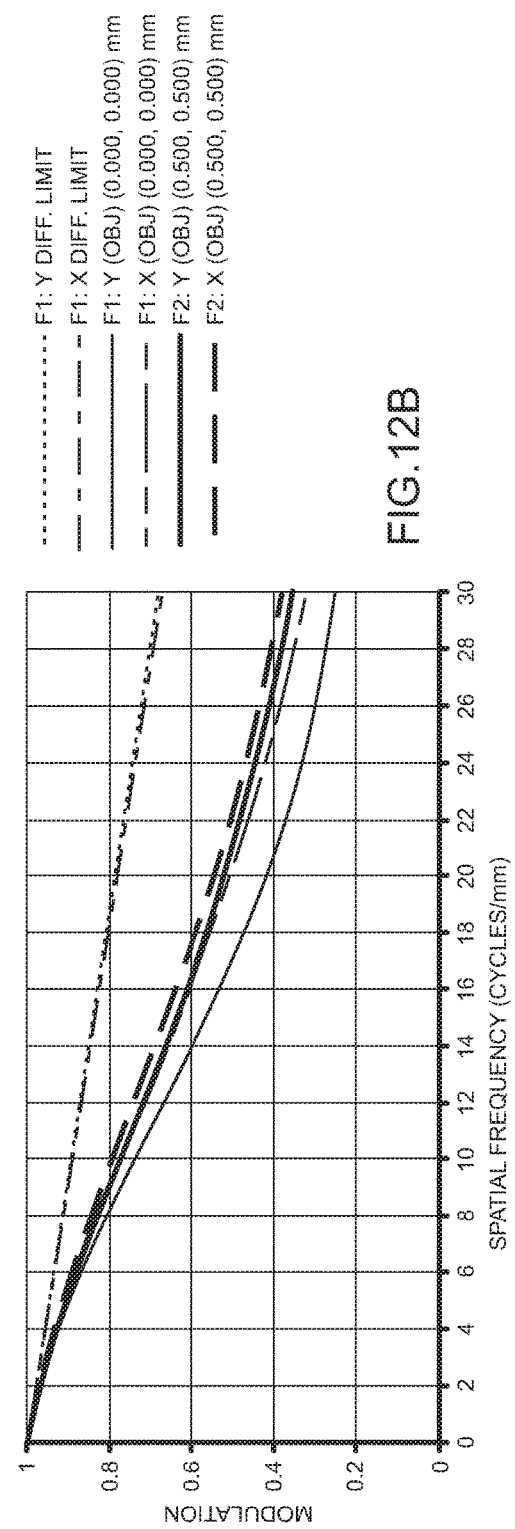
Figure 13A:
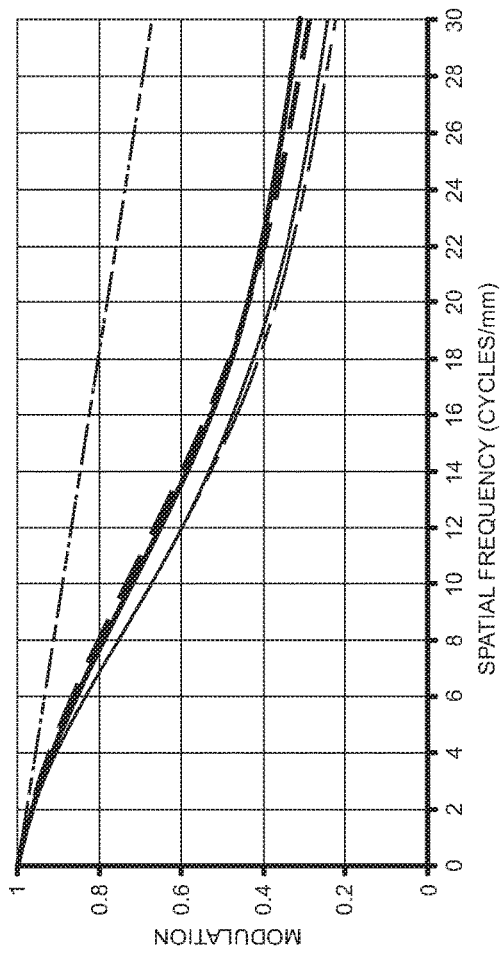
FIGS. 13A, 13B illustrate MTF plots for the reconstruction points shifted away from CDP by 0.75 diopters for fields on-axis to the MLA (FIG. 13A) and for fields for the furthest MLA element near the edge of the MLA (FIG. 13B)
Figure 13B:
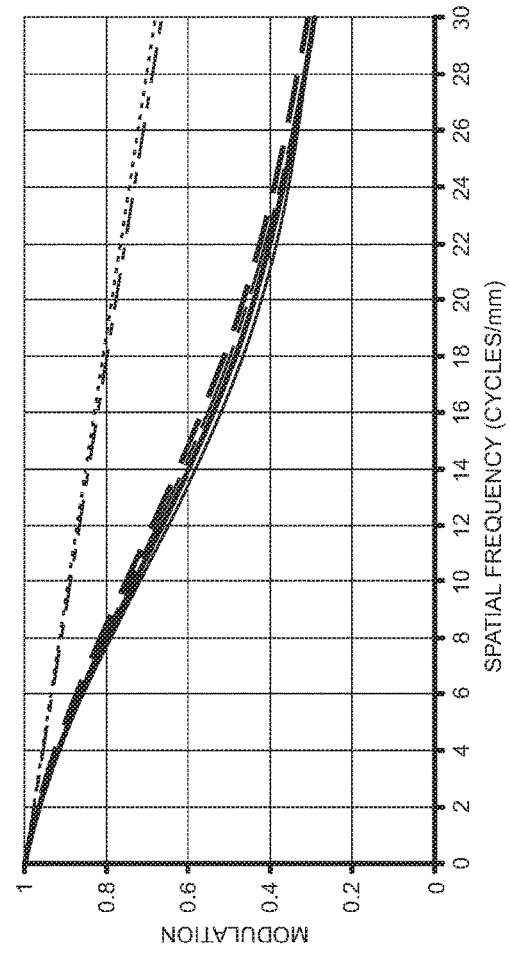

During the design process, three representative wavelengths, 465 nm, 550 nm, and 630 nm were selected which correspond to the peak emission spectra of the blue, green and red emitters within the selected OLED microdisplay. A total of 21 lenslets in the MLA were sampled with each representing 9 element image points, which added up a total of 189 field samples. To evaluate the image quality, an ideal lens with the same power as the eyepiece is placed at the exit pupil of the system (viewing window), which resulted in a cut-off frequency of 20.83 lp/mm for the final image, limited by the pixel size of the microdisplay. The optical performance of the designed system was assessed at representative field angles for the three design wavelengths. By changing the power of the tunable lens VFE, the central depth plane could be shifted axially in a large range, for example, from 0 to 3 diopters, without noticeable degeneration of optical performance. FIGS. 8 through 10 plot the polychromatic modulation transfer function (MTF) for points reconstructed on the CDP set at the depth of 3, 1, and 0 diopters, respectively. For each CDP position, two sets of MTFs were plotted, one for fields corresponding to the on-axis MLA and one for fields correspond to the furthest MLA near the edge.

On the other hand, it is equally important to assess how the image quality of a 3D reconstruction point degrades when the reconstructed image is shifted away from the central depth plane for a specific tunable state. This can be evaluated by shifting the central depth plane a small amount of distance without changing the power of the tunable lens. FIGS. 11 through 14 plot the polychromatic MTF for reconstructed points shifted away from the CDP by 0.25, 0.5, 0.75, and 1 diopters, respectively. For each depth, two sets of MTFs were plotted, one for fields corresponding to the on-axis MLA and one for fields corresponding to the furthest MLA near the edge.

Figure 15:
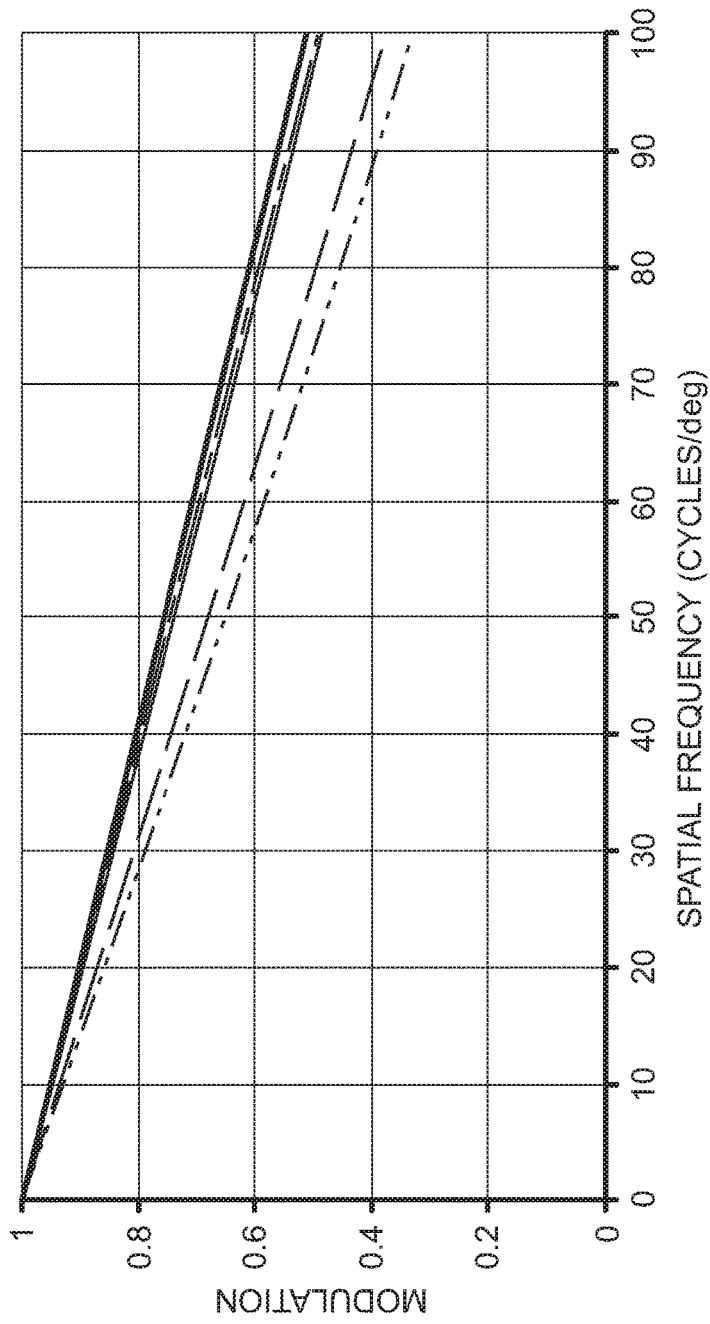
FIG. 15 illustrates the MTF for the see-through path FOV 65°×40°.

FIG. 15 plots the polychromatic MTF for the 65°×40° FOV. Across the entire the FOV, the see-through path achieved an average MTF value of over 50% at 30 cycles/degree frequency, corresponding to 20/20 normal vision, and nearly 20% at 60 cycles/degree frequency, corresponding to 20/10 vision or 0.5 arc minute of visual acuity.

What is claimed is:

1. A head-mounted display integral imaging (InI) system, comprising:
    a microscopic InI unit (micro-InI) configured to create light fields of a selected 3D scene at a selected position along an optical axis of the system;
    a relay unit having a vari-focal element (VFE) disposed therein, the relay unit disposed on the optical axis at a location so the selected position is an optical conjugate of the relay unit, the relay unit configured to receive the light fields created by the microscopic InI unit; and
    the freeform waveguide prism according to any of the preceding claims for receiving light from the relay unit to provide an image of the 3D scene at an exit pupil of the system for viewing by a user of the head-mounted display system,
    wherein the VFE is configured to tune the location of the intermediate image within the body of the prism, the freeform waveguide prism comprising:
        a first freeform optical surface disposed to receive light from the lightfield and refract the received light into the body of the prism;
        a second freeform optical surface disposed to receive the refracted light from the first freeform optical surface and reflect the light into the body of the prism to provide an intermediate image of the lightfield at a selected location within the body of the prism;
        a third freeform optical surface disposed to receive the light from the intermediate image and total internally reflect the light into the body of the prism; and
        a fourth freeform optical surface disposed to receive the reflected light from the third freeform optical surface and reflect the light back to the third freeform optical surface at an angle that allows the light to exit the prism, the first through fourth freeform optical surfaces cooperating so that the light exiting the prism through the third freeform optical surface produces an image of the light field at a selected location external to the prism.

2. The head-mounted display integral imaging (InI) system according to claim 1, wherein the second freeform optical surface is configured to total internally reflect the light into the body of the prism.

3. The head-mounted display integral imaging (InI) system according to claim 1, wherein the second freeform optical surface is mirrored to reflect the light into the body of the prism.

4. The head-mounted display integral imaging (InI) system according to claim 1, wherein the third freeform optical surface is configured to total internally reflect the light from the second freeform optical surface into the body of the prism.

5. The head-mounted display integral imaging (InI) system according to claim 1, wherein the fourth freeform optical surface is mirrored.

6. The head-mounted display integral imaging (InI) system according to claim 1, wherein the fourth freeform optical surface includes a beamsplitting coating.

7. The head-mounted display integral imaging (InI) system according to claim 1, wherein for an orthogonal X-Y-Z coordinate system, the Z-axis is along the viewing direction, the Y-axis is parallel to the horizontal direction aligned with interpupilary direction of a user, and the X-axis is in the vertical direction aligning with the head orientation of the user.

8. The head-mounted display integral imaging (InI) system according to claim 7, wherein the freeform waveguide prism is symmetric about the horizontal (Y-Z) plane.

9. The head-mounted display integral imaging (InI) system according to claim 7, wherein the first through fourth freeform optical surfaces are decentered along the horizontal Y-axis and rotated about the vertical X-axis.

10. The head-mounted display integral imaging (InI) system according to claim 1, wherein the shape of any one of the first through fourth freeform optical surfaces is given by $$z = \frac{cr^2}{1+\sqrt{1-(1+k)c^2r^2}} + \sum_{j=2}^{66} C_j x^m y^n \quad j = \frac{(m+n)^2+m+3n}{2}+1,$$

where z is the sag of the free-form surface measured along the z-axis of a local x, y, z coordinate system, c is the vertex curvature (CUY), r is the radial distance, k is the conic constant, and $C_j$ is the coefficient for $x^m y^n$.

11. The head-mounted display integral imaging (InI) system of claim 1, wherein the microscopic InI unit (micro-InI) is configured to reproduce full-parallax light fields of a 3D scene having a constrained viewing zone.

12. The freeform waveguide prism or head-mounted display integral imaging (InI) system of claim 1, comprising a see-through unit in optical communication with the free-form waveguide prism to transmit a view of a real world to the freeform waveguide prism.

13. The head-mounted display integral imaging (InI) system of claim 1, wherein the relay unit comprises a first lens group and wherein the VFE is located at a back focal length of the first lens group.

14. The head-mounted display integral imaging (InI) system of claim 1, wherein the field of view of the system is independent of the optical power of the VFE.

15. The head-mounted display integral imaging (InI) system of claim 1, wherein the VFE is disposed on the optical axis at a location such that the compound optical power of the relay unit is maintained constant, independent of the optical power of the VFE.

16. The head-mounted display integral imaging (InI) system of claim 1, wherein the microscopic InI unit includes a microdisplay and the subtended field angle of the microdisplay through the freeform waveguide prism is maintained constant, independent of the optical power of the VFE.

17. The head-mounted display integral imaging (InI) system of claim 1, wherein the relay unit is configured to tune the position along the optical axis of the position of a reconstructed 3D virtual scene through the eyepiece by up to 5 diopters.

18. The head-mounted display integral imaging (InI) system of claim 1, wherein the focal range of the VFE is 75-100 mm.

19. The head-mounted display integral imaging (InI) system of claim 1, wherein the focal length of the freeform waveguide prism is 27.5 mm.

20. The head-mounted display integral imaging (InI) system of claim 1, wherein the diagonal field of view of the system is 35°.

21. The head-mounted display integral imaging (InI) system of claim 1, wherein the system has an optical resolution as high as 2 arc minutes per pixel.

22. The head-mounted display integral imaging (InI) system of claim 1, wherein the microscopic InI unit comprises a micro-lens array of which at least one lens surface is represented by the equation $$z = \frac{cr^2}{1+\sqrt{1-(1+k)c^2r^2}} + Ar^4 + Br^6 + Cr^8 + Dr^{10} + Er^{12},$$

where z is the sag of the surface measured along the z-axis of a local x, y, z coordinate system, c is the vertex curvature, r is the radial distance, k is the conic constant, A through E are the 4th, 6th, 8th, 10th and 12th order deformation coefficients, respectively.

23. The head-mounted display integral imaging (InI) system of claim 1, wherein the microscopic InI unit comprises a microdisplay image source that renders set of 2D elemental images, each image representing a different perspective of a 3D scene, and an aperture array disposed between the microdisplay image source and the relay unit.

\* \* \* \* \*